United States Patent
Gao

(10) Patent No.: US 12,301,370 B2
(45) Date of Patent: May 13, 2025

(54) METHOD OF DETERMINING HYBRID AUTOMATIC REPEAT REQUEST ACKNOWLEDGEMENT CODEBOOK, TERMINAL AND NETWORK DEVICE

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 460 days.

(21) Appl. No.: 17/626,723

(22) PCT Filed: Jul. 8, 2020

(86) PCT No.: PCT/CN2020/100853
§ 371 (c)(1),
(2) Date: Jan. 12, 2022

(87) PCT Pub. No.: WO2021/008419
PCT Pub. Date: Jan. 21, 2021

(65) Prior Publication Data
US 2022/0255682 A1   Aug. 11, 2022

(30) Foreign Application Priority Data
Jul. 12, 2019  (CN) .......................... 201910631019.9

(51) Int. Cl.
*H04W 72/04* (2023.01)
*H04L 1/1867* (2023.01)
(Continued)

(52) U.S. Cl.
CPC .......... *H04L 1/1887* (2013.01); *H04L 5/0055* (2013.01); *H04W 72/0446* (2013.01)

(58) Field of Classification Search
None
See application file for complete search history.

(56) References Cited

U.S. PATENT DOCUMENTS

2018/0019843 A1   1/2018 Papasakellariou
2018/0263021 A1   9/2018 He et al.
(Continued)

FOREIGN PATENT DOCUMENTS

CN    107925532 A    4/2018
CN    109075914 A    12/2018
(Continued)

OTHER PUBLICATIONS

3GPP TSG RAN WG1 #96bis R1-1904408; Xi'an, China, Apr. 8-12, 2019 Samsung, HARQ enhancements for NR-U (Year: 2019).*
(Continued)

*Primary Examiner* — Kodzovi Acolatse
(74) *Attorney, Agent, or Firm* — Ladas & Parry, LLP

(57) ABSTRACT

A method of determining a Hybrid Automatic Repeat reQuest acknowledgement codebook, a terminal, and a network device are provided. The method includes: determine a HARQ-ACK codebook in a first slot according to a target offset set, when a HARQ-ACK is received in the first slot; wherein the HARQ-ACK is a HARQ-ACK, transmitted in a second slot, for a PDSCH or a SPS PDSCH release, the target offset set W=K1+TA_offset, K1 is a timing value set indicating an interval between a slot of the PDSCH or the SPS PDSCH release and a corresponding slot of the HARQ-ACK, TA_offset is a value related to a TA configured by a signaling or calculated in a predetermined manner, and n_U=n+k+TA_offset, k is one value in the K1, n_U is an index of the first slot, n is an index of the second slot.

20 Claims, 8 Drawing Sheets

(51) Int. Cl.
    *H04L 5/00*     (2006.01)
    *H04W 72/0446*     (2023.01)

(56) References Cited

U.S. PATENT DOCUMENTS

| | | | |
|---|---|---|---|
| 2019/0037586 A1 | 1/2019 | Park et al. | |
| 2019/0045460 A1 | 2/2019 | Muruganathan et al. | |
| 2019/0132838 A1* | 5/2019 | Yi | H04L 5/0055 |
| 2019/0313386 A1* | 10/2019 | Hwang | H04W 74/006 |
| 2019/0363832 A1* | 11/2019 | Yang | H04L 5/00 |
| 2019/0364557 A1 | 11/2019 | Harada et al. | |
| 2020/0092068 A1* | 3/2020 | Yang | H04L 1/1858 |
| 2020/0252895 A1* | 8/2020 | Yi | H04W 56/0005 |
| 2020/0267597 A1* | 8/2020 | Huang | H04W 76/14 |
| 2020/0328848 A1* | 10/2020 | He | H04L 1/1854 |
| 2021/0084622 A1* | 3/2021 | Choi | H04L 1/1812 |
| 2021/0105761 A1* | 4/2021 | Cheng | H04B 7/2125 |
| 2021/0314889 A1* | 10/2021 | Rico Alvarino | H04L 5/0092 |
| 2021/0314892 A1* | 10/2021 | Rico Alvarino | H04W 72/23 |

FOREIGN PATENT DOCUMENTS

| | | | | |
|---|---|---|---|---|
| CN | 109923894 A | | 6/2019 | |
| CN | 109952716 A | | 6/2019 | |
| EP | 3468081 | | 4/2019 | |
| TW | 202023221 A | * | 6/2020 | H04L 1/1854 |
| WO | 2017/164626 A2 | | 9/2017 | |
| WO | WO-2019160364 A1 | * | 8/2019 | H04B 1/713 |
| WO | WO-2019160387 A1 | * | 8/2019 | H04L 1/0047 |
| WO | WO-2019219072 A1 | * | 11/2019 | H04L 1/1812 |
| WO | WO-2020031155 A1 | * | 2/2020 | H04B 7/2125 |
| WO | WO-2020091669 A1 | * | 5/2020 | H04L 1/1854 |
| WO | WO-2020223195 A1 | * | 11/2020 | H04L 1/1614 |
| WO | WO-2020257692 A1 | * | 12/2020 | H04L 1/1854 |
| WO | WO-2021033094 A1 | * | 2/2021 | H04B 7/18504 |
| WO | WO-2021164579 A1 | * | 8/2021 | H04B 7/18513 |

OTHER PUBLICATIONS

International Preliminary Report on Patentability issued for PCT/CN2020/100853 dated Jan. 31, 2022, and Its English Translation provided by WIPO.
International Search Report issued for PCT/CN2020/100853 dated Sep. 27, 2020, and its English translation provided by WIPO.
Written Opinion for PCT/CN2020/100853 dated Sep. 27, 2020, and its English translation provided by WIPO.
"HARQ Enhancements for NR-U" 3GPP TSG RAN WG1 #96bis R1-1904408, Xi'an, China, Apr. 8-12, 2019, Agenda Item: 7.2.2.2.3, Source: Samsung, entire document.
First Office Action for Chinese Patent Application 201910631019.9 issued on Jun. 21, 2021, and its English Translation.
"Remaining aspects of HARQ management" 3GPP TSG RAN WG1 Meeting 90bis R1-1718621, Prague, Czech, Oct. 9-13, 2017, entire document.
Second Office Action for Chinese Patent Application 201910631019.9 issued on Jan. 18, 2022, and its English Translation.
Notice of Allowance for Chinese Patent Application 201910631019.9 issued on Mar. 11, 2022, and its English Translation.
Extended European Search Report for European Patent Application 20841573.7, issued on Aug. 4, 2022 by the European Patent Office.
"Corrections on CA operation," 3GPP TSG RAN WG1 Meeting #93, R1-1806740, Busan, Korea, May 21-25, 2018, Agenda item: 7.1.3.4.2, Source: Samsung, all pages.

* cited by examiner

METHOD OF DETERMINING HYBRID AUTOMATIC REPEAT REQUEST ACKNOWLEDGEMENT CODEBOOK, TERMINAL AND NETWORK DEVICE

CROSS-REFERENCE TO RELATED APPLICATIONS

This application is the U.S. national phase of PCT Application No. PCT/CN2020/100853 filed on Jul. 8, 2020, which claims a priority to Chinese Patent Application No. 201910631019.9 filed on Jul. 12, 2019, the disclosures of which are incorporated in their entireties by reference herein.

TECHNICAL FIELD

The present disclosure relates to the field of communication application technologies, in particular, relates to a method of determining a Hybrid Automatic Repeat reQuest acknowledgement codebook, a terminal and a network device.

BACKGROUND

In a satellite communication system, considering that a cell diameter of the satellite communication system is large (up to 1000 km), a maximum value of Timing Advance (TA) in a cell is much larger than a TA value in a New Radio (NR) cell, and can be more than 3 ms. In a NR system, the TA and a processing delay are supported by selecting a proper feedback timing K1. However, the K1 in NR can only support a time length of 0 to 15 slots, that is, the maximum value is 15 slot intervals. In the satellite communication system, taking a subcarrier of 120 kHz as an example, a time length of 24 slots is required for the TA of 3 ms. This time length cannot be covered by a value of the K1 in the related art. Therefore, on the basis of not changing the value of K1 in the related art, a new feedback timing needs to be introduced to define a relationship between a slot of a PDSCH and a slot of a HARQ-ACK, to ensure that there is no collision between a location for transmitting the HARQ-ACK and downlink transmission after taking into account the TA. Since determination of a HARQ-ACK codebook in NR is directly related to a feedback timing. Accordingly, there is no clear method of how to determine the HARQ-ACK codebook under the new feedback timing.

SUMMARY

An objective of the present disclosure is to provide a method of determining a Hybrid Automatic Repeat reQuest (HARQ) acknowledgement codebook, a terminal, and a network device, to solve the problem of how to determine a HARQ-ACK codebook in a satellite communication system.

To achieve the above objective, some embodiments of the present disclosure provide a method of determining a Hybrid Automatic Repeat reQuest acknowledgement codebook. The method is performed by a terminal and includes determining a Hybrid Automatic Repeat reQuest (HARQ)-acknowledgement (ACK) codebook in a first slot according to a target offset set, when a HARQ-ACK is transmitted in the first slot; wherein the HARQ-ACK is a HARQ-ACK for a Physical Downlink Shared Channel (PDSCH) transmitted in a second slot or a Semi-Persistently Scheduled (SPS) PDSCH release transmitted in a second slot, the target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the set of K1, n_U is an index of the first slot, n is an index of the second slot.

Determining the HARQ-ACK codebook in the first slot according to the target offset set includes: determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot; obtaining the HARQ-ACK codebook in the first slot according to the candidate PDSCH opportunity set corresponding to each carrier.

Determining the candidate PDSCH opportunity set corresponding to each carrier according to the target offset set includes at least one of the following first and second manners. The first manner includes: obtaining each downlink slot corresponding to the first slot according to $n\_U-w_i$; obtaining the candidate PDSCH opportunity set corresponding to each carrier according to the each downlink slot; wherein $w_i$ belongs to W, i=0, 1, . . . , T-1, T is a quantity of elements in W, or $w_i=k_i+TA\_offset$, $k_i$ belongs to K1, i=0, 1, . . . , T-1, T is a quantity of elements in K1. The second manner includes: obtaining each group of downlink slots corresponding to the first slot according to $n\_U-w_i-S$, wherein each group of downlink slots includes at least one downlink slot; obtaining the candidate PDSCH opportunity set corresponding to each carrier according to the each group of downlink slots; wherein S=0, 1, . . . , Krept-1, Krept is a quantity of repetition transmissions of PDSCH, and Krept=1 when repetition transmission is not configured; $w_i$ belongs to W, i=0, 1, . . . , T-1, T is a quantity of elements in W, or $w_i=k_i+TA\_offset$, $k_i$ belongs to K1, i=0, 1, . . . , T-1, T is a quantity of elements in K1.

In the first manner, obtaining the candidate PDSCH opportunity set corresponding to each carrier according to each downlink slot includes: determining the each downlink slot as a candidate PDSCH opportunity; or, determining whether each downlink slot includes a valid Start and Length Indicator Value (SLIV) as a PDSCH time-domain transmission position, and taking each downlink slot including a valid SLIV as the candidate PDSCH opportunity; or, determining the each downlink slot as a candidate PDSCH opportunity if receiving more than one PDSCH in one slot is not supported, or determining, for the each downlink slot, at least one SLIV group according to an overlapping rule of SLIVs in a slot and taking each SLIV group as a candidate PDSCH opportunity if receiving more than one PDSCH in one slot is supported; or, determining whether the each downlink slot includes a valid SLIV as a PDSCH time-domain transmission position, and taking each downlink slot including a valid SLIV as one candidate PDSCH opportunity if receiving more than one PDSCH in one slot is not supported, or determining, for each downlink slot including a valid SLIV, at least one SLIV group according to an overlapping rule of valid SLIVs in one slot and taking each SLIV group as a candidate PDSCH opportunity, if receiving more than one PDSCH in one slot is supported; in the second manner, obtaining the candidate PDSCH opportunity set corresponding to each carrier according to each group of downlink slots includes: determining, for each group of downlink slots, whether one SLIV in the SLIV set is valid in each downlink slot in the each group of downlink slots, and when a valid SLIV is included in the SLIV set, determining the each group of downlink slots as one candidate PDSCH opportunity; or, determining, for each group of downlink slots, whether one SLIV in the SLIV set is valid in each downlink slot in the each group of downlink slots; and when a valid SLIV is included in the SLIV set, and determining the each group of downlink slots as a candidate PDSCH opportunity if receiving more than one PDSCH in one slot is not supported, or determining at least one SLIV group according to an overlapping rule of valid SLIVs and taking each SLIV group as a candidate PDSCH opportunity, if receiving more than one PDSCH in one slot is supported.

In the first manner, determining whether the SLIV is valid includes: determining that the SLIV is an invalid SLIV if a time-domain symbol corresponding to the SLIV overlaps with at least one uplink symbol in a corresponding downlink slot; otherwise if any time-domain symbol corresponding to the SLIV does not overlap with an uplink symbol in a corresponding downlink slot, determining that the SLIV is a valid SLIV In the second manner, determining whether the SLIV is valid includes: determining that the SLIV is an invalid SLIV if a time-domain symbol corresponding to the SLIV overlaps with at least one uplink symbol in any downlink slot of a corresponding group of downlink slots; otherwise if any time-domain symbol corresponding to the SLIV overlaps with an uplink symbol in any downlink slot of a corresponding group of downlink slots, determining the SLIV as a valid SLIV Determining the HARQ-ACK codebook in the first slot according to the target offset set includes: when the HARQ-ACK codebook is a dynamic HARQ-ACK codebook, determining a PDCCH detection opportunity set corresponding to each carrier according to the target offset set and a K0 set, wherein K0 represents a set of timing values for an interval between a slot of a PDCCH transmission and a slot of a PDSCH transmission scheduled by the PDCCH; detecting a PDCCH in an entirety set of the PDCCH detection opportunity set corresponding to each carrier, and determining an HARQ-ACK codebook in the first slot according to a Downlink Allocation Index (DAI) value in the detected PDCCH.

Determining the PDCCH detection opportunity set corresponding to each carrier according to the target offset set and the K0 set includes: when a quantity Krept of repetition transmissions of PDSCH is configured, determining the PDCCH detection opportunity set corresponding to each carrier according to the target offset set, the K0 set, and the quantity of repetition transmissions.

An index of an uplink slot is numbered in a manner of being a TA time ahead of an index of a downlink slot, wherein TA=TA_offset, or TA is greater than TA_offset; or, an index of an uplink slot is numbered in a manner that an uplink slot is aligned with a downlink slot.

To achieve the above objective, some embodiments of the present disclosure further provide a method of determining a Hybrid Automatic Repeat reQuest acknowledgement codebook. The method is performed by a network device and includes determining a Hybrid Automatic Repeat reQuest (HARQ)-acknowledgement (ACK) codebook in a first slot according to a target offset set, when a HARQ-ACK is received in the first slot; wherein the HARQ-ACK is a HARQ-ACK for a Physical Downlink Shared Channel (PDSCH) transmitted in a second slot or a Semi-Persistently Scheduled (SPS) PDSCH release transmitted in a second slot, the target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the set of K1, n_U is an index of the first slot, n is an index of the second slot.

Determining the HARQ-ACK codebook in the first slot according to the target offset set includes: determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot; obtaining the HARQ-ACK codebook in the first slot according to the candidate PDSCH opportunity set corresponding to each carrier.

Determining the candidate PDSCH opportunity set corresponding to each carrier according to the target offset set includes at least one of the following first and second manners. The first manner includes: obtaining each downlink slot corresponding to the first slot according to $n\_U-w_i$; obtaining the candidate PDSCH opportunity set corresponding to each carrier according to the each downlink slot; wherein $w_i$ belongs to W, i=0, 1, . . . , T-1, T is a quantity of elements in W, or $w_i=k_i+TA\_offset$. $k_i$ belongs to K1, i=0, 1, . . . , T-1, T is a quantity of elements in K1. The second manner includes: obtaining each group of downlink slots corresponding to the first slot according to $n\_U-w_i-S$, wherein each group of downlink slots includes at least one downlink slot; obtaining the candidate PDSCH opportunity set corresponding to each carrier according to the each group of downlink slots; wherein S=0, 1, . . . , Krept-1, Krept is a quantity of repetition transmissions of PDSCH, and Krept=1 when repetition transmission is not configured; $w_i$ belongs to W, i=0, 1, . . . , T-1, T is a quantity of elements in W, or $w_i=k_i+TA\_offset$, $k_i$ belongs to K1, i=0, 1, . . . , T-1, T is a quantity of elements in K1.

In the first manner, obtaining the candidate PDSCH opportunity set corresponding to each carrier according to each downlink slot includes: determining the each downlink slot as a candidate PDSCH opportunity; or, determining whether each downlink slot includes a valid Start and Length Indicator Value (SLIV) as a PDSCH time-domain transmission position, and taking each downlink slot including a valid SLIV as the candidate PDSCH opportunity; or, determining the each downlink slot as a candidate PDSCH opportunity if receiving more than one PDSCH in one slot is not supported, or determining, for the each downlink slot, at least one SLIV group according to an overlapping rule of SLIVs in a slot and taking each SLIV group as a candidate PDSCH opportunity if receiving more than one PDSCH in one slot is supported; or, determining whether the each downlink slot includes a valid SLIV as a PDSCH time-domain transmission position, and taking each downlink slot including a valid SLIV as one candidate PDSCH opportunity if receiving more than one PDSCH in one slot is not supported, or determining, for each downlink slot including a valid SLIV, at least one SLIV group according to an overlapping rule of valid SLIVs in one slot and taking each SLIV group as a candidate PDSCH opportunity, if receiving more than one PDSCH in one slot is supported. In the second manner, obtaining the candidate PDSCH opportunity set corresponding to each carrier according to each group of downlink slots includes: determining, for each group of downlink slots, whether one SLIV in the SLIV set is valid in each downlink slot in the each group of downlink slots, and when a valid SLIV is included in the SLIV set, determining the each group of downlink slots as one candidate PDSCH opportunity; or, determining, for each group of downlink slots, whether one SLIV in the SLIV set is valid in each downlink slot in the each group of downlink slots; and when a valid SLIV is included in the SLIV set, and determining the each group of downlink slots as a candidate PDSCH opportunity if receiving more than one PDSCH in one slot is not supported, or determining at least one SLIV group according to an overlapping rule of valid SLIVs, and taking each SLIV group as a candidate PDSCH opportunity, if receiving more than one PDSCH in one slot is supported.

In the first manner, determining whether the SLIV is valid includes: determining that the SLIV is an invalid SLIV if a time-domain symbol corresponding to the SLIV overlaps with at least one uplink symbol in a corresponding downlink slot; or if any time-domain symbol corresponding to the SLIV does not overlap with an uplink symbol in a corresponding downlink slot, determining that the SLIV is a valid SLIV. In the second manner, determining whether the SLIV is valid includes: determining that the SLIV is an invalid SLIV if a time-domain symbol corresponding to the SLIV overlaps with at least one uplink symbol in any downlink slot of a corresponding group of downlink slots; otherwise, if any time-domain symbol corresponding to the SLIV overlaps with an uplink symbol in any downlink slot of a corresponding group of downlink slots determining the SLIV as a valid SLIV Determining the HARQ-ACK codebook in the first slot according to the target offset set includes: when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH transmission and a slot of a PDSCH transmission scheduled by the PDCCH; transmitting a PDCCH in at least one PDCCH detection opportunity in an entirety set of the PDCCH detection opportunity set corresponding to each carrier, and determining an HARQ-ACK codebook in the first slot according to a Downlink Allocation Index (DAI) value in the transmitted PDCCH.

Determining the PDCCH detection opportunity set corresponding to each carrier according to the target offset set and the K0 set includes: when a quantity Krept of repetition transmissions of PDSCH is configured, determining the PDCCH detection opportunity set corresponding to each carrier according to the target offset set, the K0 set, and the quantity of repetition transmissions.

An index of an uplink slot is numbered in a manner of being a TA time ahead of an index of a downlink slot, wherein TA=TA_offset, or TA is greater than TA_offset; or, an index of an uplink slot is numbered in a manner that an uplink slot is aligned with a downlink slot.

To achieve the above objective, some embodiments of the present disclosure provide a terminal. The terminal includes a transceiver, a storage, a processor and a program stored on the storage and executable on the processor, wherein when the processor executes the program, the processor implements following: determining a Hybrid Automatic Repeat reQuest (HARQ)-acknowledgement (ACK) codebook in a first slot according to a target offset set, when a HARQ-ACK is transmitted in the first slot; wherein the HARQ-ACK is a HARQ-ACK for a Physical Downlink Shared Channel (PDSCH) transmitted in a second slot or a Semi-Persistently Scheduled (SPS) PDSCH release transmitted in a second slot, the target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the set of K1, n_U is an index of the first slot, n is an index of the second slot.

Determining the HARQ-ACK codebook in the first slot according to the target offset set performed by the processor includes: determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot; obtaining the HARQ-ACK codebook in the first slot according to the candidate PDSCH opportunity set corresponding to each carrier.

Determining the candidate PDSCH opportunity set corresponding to each carrier according to the target offset set performed by the processor includes at least one of the following first and second manners. The first manner includes: obtaining each downlink slot corresponding to the first slot according to $n\_U-w_i$; obtaining the candidate PDSCH opportunity set corresponding to each carrier according to the each downlink slot; wherein $w_i$ belongs to W, i=0, 1, . . . , T-1, T is the number of elements in W, or $w_i=k_i$+TA_offset. $k_i$ belongs to K1, i=0, 1, . . . , T-1, T is the number of elements in K1. The second manner includes: obtaining each group of downlink slots corresponding to the first slot according to $n\_U-w_i$-S, wherein each group of downlink slots includes at least one downlink slot; obtaining the candidate PDSCH opportunity set corresponding to each carrier according to the each group of downlink slots; wherein S=0, 1, . . . , Krept-1, Krept is a quantity of repetition transmissions of PDSCH, and Krept=1 when repetition transmission is not configured; $w_i$ belongs to W, i=0, 1, . . . , T-1, T is a quantity of elements in W, or $w_i=k_i$+TA_offset, $k_i$ belongs to K1, i=0, 1, . . . , T-1, T is a quantity of elements in K1.

Obtaining the candidate PDSCH opportunity set corresponding to each carrier according to each downlink slot performed by the processor includes: determining the each downlink slot as a candidate PDSCH opportunity; or, determining whether each downlink slot includes a valid Start and Length Indicator Value (SLIV) as a PDSCH time-domain transmission position, and taking each downlink slot including a valid SLIV as the candidate PDSCH opportunity; or, determining the each downlink slot as a candidate PDSCH opportunity if receiving more than one PDSCH in one slot is not supported, or determining, for the each downlink slot, at least one SLIV group according to an overlapping rule of SLIVs in a slot and taking each SLIV group as a candidate PDSCH opportunity if receiving more than one PDSCH in one slot is supported; or, determining whether the each downlink slot includes a valid SLIV as a PDSCH time-domain transmission position, and taking each downlink slot including a valid SLIV as one candidate PDSCH opportunity if receiving more than one PDSCH in one slot is not supported, or determining, for each downlink slot including a valid SLIV, at least one SLIV group according to an overlapping rule of valid SLIVs in one slot and taking each SLIV group as a candidate PDSCH opportunity, if receiving more than one PDSCH in one slot is supported; obtaining the candidate PDSCH opportunity set corresponding to each carrier according to each group of downlink slots performed by the processor includes: determining, for each group of downlink slots, whether one SLIV in the SLIV set is valid in each downlink slot in the each group of downlink slots, and when a valid SLIV is included in the SLIV set, determining the each group of downlink slots as one candidate PDSCH opportunity; or, determining, for each group of downlink slots, whether one SLIV in the SLIV set is valid in each downlink slot in the each group of downlink slots; and when a valid SLIV is included in the SLIV set, and determining the each group of downlink slots as a candidate PDSCH opportunity if receiving more than one PDSCH in one slot is not supported, or determining at least one SLIV group according to an overlapping rule of valid SLIVs, and taking each SLIV group as a candidate PDSCH opportunity, if receiving more than one PDSCH in one slot is supported.

In the first manner, determining whether the SLIV is valid performed by the processor includes: determining that the SLIV is an invalid SLIV if a time-domain symbol corresponding to the SLIV overlaps with at least one uplink symbol in a corresponding downlink slot; otherwise if any time-domain symbol corresponding to the SLIV does not overlap with an uplink symbol in a corresponding downlink slot, determining that the SLIV is a valid SLIV. In the second manner, determining whether the SLIV is valid performed by the processor includes: determining that the SLIV is an invalid SLIV if a time-domain symbol corresponding to the SLIV overlaps with at least one uplink symbol in any downlink slot of a corresponding group of downlink slots; otherwise, if any time-domain symbol corresponding to the SLIV overlaps with an uplink symbol in any downlink slot of a corresponding group of downlink slots, determining the SLIV as a valid SLIV.

Determining the HARQ-ACK codebook in the first slot according to the target offset set performed by the processor includes: when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH transmission and a slot of a PDSCH transmission scheduled by the PDCCH; detecting a PDCCH in an entirety set of the PDCCH detection opportunity set corresponding to each carrier, and determining an HARQ-ACK codebook in the first slot according to a Downlink Allocation Index (DAI) value in the detected PDCCH.

Determining the PDCCH detection opportunity set corresponding to each carrier according to the target offset set and the K0 set performed by the processor includes: when a quantity Krept of repetition transmissions of PDSCH is configured, determining the PDCCH detection opportunity set corresponding to each carrier according to the target offset set, the K0 set, and the quantity of repetition transmissions.

An index of an uplink slot is numbered in a manner of being a TA time ahead of an index of a downlink slot, wherein TA=TA_offset, or TA is greater than TA_offset; or, an index of an uplink slot is numbered in a manner that an uplink slot is aligned with a downlink slot.

To achieve the above objective, some embodiments of the present disclosure further provide a computer-readable storage medium. The computer-readable storage medium includes a computer program stored on the computer-readable storage medium, wherein, when the computer program is executed by the processor, the processor implements steps of the method of determining the Hybrid Automatic Repeat reQuest acknowledgement codebook.

To achieve the above objective, some embodiments of the present disclosure further provide a network device. The network device includes a transceiver, a storage, a processor, and a program stored on the storage and executable on the processor, wherein when the processor executes the program, the processor implements following: determining a Hybrid Automatic Repeat reQuest (HARQ)-acknowledgement (ACK) codebook in a first slot according to a target offset set, when a HARQ-ACK is received in the first slot; wherein the HARQ-ACK is a HARQ-ACK for a Physical Downlink Shared Channel (PDSCH) transmitted in a second slot or a Semi-Persistently Scheduled (SPS) PDSCH release transmitted in a second slot, the target offset set W=K1+ TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the set of K1, n_U is an index of the first slot, n is an index of the second slot.

Determining the HARQ-ACK codebook in the first slot according to the target offset set performed by the processor includes: determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot; obtaining the HARQ-ACK codebook in the first slot according to the candidate PDSCH opportunity set corresponding to each carrier.

Determining the candidate PDSCH opportunity set corresponding to each carrier according to the target offset set performed by the processor includes at least one of the following first and second manners. The first manner includes: obtaining each downlink slot corresponding to the first slot according to $n\_U-w_i$; obtaining the candidate PDSCH opportunity set corresponding to each carrier according to the each downlink slot; wherein $w_i$ belongs to W, i=0, 1, . . . , T-1, T is a quantity of elements in W, or $w_i=k_i+TA\_offset$. $k_i$ belongs to K1, i=0, 1, . . . , T-1, T is a quantity of elements in K1. The second manner includes: obtaining each group of downlink slots corresponding to the first slot according to $n\_U-w_i-S$, wherein each group of downlink slots includes at least one downlink slot; obtaining the candidate PDSCH opportunity set corresponding to each carrier according to the each group of downlink slots; wherein S=0, 1, . . . , Krept-1, Krept is a quantity of repetition transmissions of PDSCH, and Krept=1 when repetition transmission is not configured; $w_i$ belongs to W, i=0, 1, . . . , T-1, T is a quantity of elements in W, or $w_i=k_i+TA\_offset$, $k_i$ belongs to K1, i=0, 1, . . . , T-1, T is a quantity of elements in K1.

Obtaining the candidate PDSCH opportunity set corresponding to each carrier according to each downlink slot performed by the processor includes: determining the each downlink slot as a candidate PDSCH opportunity; or, determining whether each downlink slot includes a valid Start and Length Indicator Value (SLIV) as a PDSCH time-domain transmission position, and taking each downlink slot including a valid SLIV as the candidate PDSCH opportunity; or, determining the each downlink slot as a candidate PDSCH opportunity if receiving more than one PDSCH in one slot is not supported, or determining, for the each downlink slot, at least one SLIV group according to an overlapping rule of SLIVs in a slot and taking each SLIV group as a candidate PDSCH opportunity if receiving more than one PDSCH in one slot is supported; or, determining whether the each downlink slot includes a valid SLIV as a PDSCH time-domain transmission position, and taking each downlink slot including a valid SLIV as one candidate PDSCH opportunity if receiving more than one PDSCH in one slot is not supported, or determining, for each downlink slot including a valid SLIV, at least one SLIV group according to an overlapping rule of valid SLIVs in one slot and taking each SLIV group as a candidate PDSCH opportunity, if receiving more than one PDSCH in one slot is supported. Obtaining the candidate PDSCH opportunity set corresponding to each carrier according to each group of downlink slots performed by the processor includes: determining, for each group of downlink slots, whether one SLIV in the SLIV set is valid in each downlink slot in the each group of downlink slots, and when a valid SLIV is included in the SLIV set, determining the each group of downlink slots as one candidate PDSCH opportunity; or, determining, for each group of downlink slots, whether one SLIV in the SLIV set is valid in each downlink slot in the each group of downlink slots; and when a valid SLIV is included in the SLIV set, and determining the each group of downlink slots as a candidate PDSCH opportunity if receiving more than one PDSCH in one slot is not supported, or determining at least one SLIV group according to an overlapping rule of valid SLIVs, and taking each SLIV group as a candidate PDSCH opportunity, if receiving more than one PDSCH in one slot is supported.

In the first manner, determining whether the SLIV is valid performed by the processor includes: determining that the SLIV is an invalid SLIV if a time-domain symbol corresponding to the SLIV overlaps with at least one uplink symbol in a corresponding downlink slot; or if a time-domain symbol corresponding to the SLIV does not overlap with at least one uplink symbol in a corresponding downlink slot, determining that the SLIV is a valid SLIV. In the second manner, determining whether the SLIV is valid performed by the processor includes: determining that the SLIV is an invalid SLIV if a time-domain symbol corresponding to the SLIV overlaps with at least one uplink symbol in any downlink slot of a corresponding group of downlink slots; otherwise, determining the SLIV as a valid SLIV Determining the HARQ-ACK codebook in the first slot according to the target offset set performed by the processor includes: when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH transmission and a slot of a PDSCH transmission scheduled by the PDCCH; detecting a PDCCH in an entirety set of the PDCCH detection opportunity set corresponding to each carrier, and determining an HARQ-ACK codebook in the first slot according to a Downlink Allocation Index (DAI) value in the detected PDCCH.

Determining the PDCCH detection opportunity set corresponding to each carrier according to the target offset set and the K0 set performed by the processor includes: when a quantity Krept of repetition transmissions of PDSCH is configured, determining the PDCCH detection opportunity set corresponding to each carrier according to the target offset set, the K0 set, and the quantity of repetition transmissions.

An index of an uplink slot is numbered in a manner of being a TA time ahead of an index of a downlink slot, wherein TA=TA_offset, or TA is greater than TA_offset; or, an index of an uplink slot is numbered in a manner that an uplink slot is aligned with a downlink slot.

To achieve the above objective, some embodiments of the present disclosure further provide a computer-readable storage medium including a computer program stored on the computer-readable storage medium, wherein, when the computer program is executed by a processor, the processor implements the method of determining the Hybrid Automatic Repeat reQuest acknowledgement codebook.

To achieve the above objective, some embodiments of the present disclosure further provide a terminal. The terminal includes a first determining module, configured to determine a Hybrid Automatic Repeat reQuest (HARQ)-acknowledgement (ACK) codebook in a first slot according to a target offset set, when a HARQ-ACK is transmitted in the first slot; wherein the HARQ-ACK is a HARQ-ACK for a Physical Downlink Shared Channel (PDSCH) transmitted in a second slot or a Semi-Persistently Scheduled (SPS) PDSCH release transmitted in a second slot, the target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the set of K1, n_U is an index of the first slot, n is an index of the second slot.

To achieve the above objective, some embodiments of the present disclosure further provide a network device. The network device includes a second determining module, configured to determining a Hybrid Automatic Repeat reQuest (HARQ)-acknowledgement (ACK) codebook in a first slot according to a target offset set, when a HARQ-ACK is received in the first slot; wherein the HARQ-ACK is a HARQ-ACK for a Physical Downlink Shared Channel (PDSCH) transmitted in a second slot or a Semi-Persistently Scheduled (SPS) PDSCH release transmitted in a second slot, the target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the set of K1, n_U is an index of the first slot, n is an index of the second slot.

The embodiments of the present disclosure have the following advantageous effects:

According to the above technical solutions of the embodiments of the present disclosure, when the HARQ-ACK is transmitted in the first slot, the HARQ-ACK codebook in the first slot is determined according to the target offset set W=K1+TA_offset, thereby ensuring that the HARQ-ACK codebook correctly includes PDSCH candidate positions corresponding to HARQ-ACK feedbacks required to be performed in the first slot, and ensuring normal transmission of the HARQ-ACKs.

DETAILED DESCRIPTION

In order to make technical problems, technical solutions and advantages to be solved by the present disclosure more apparent, a detailed description will be given in conjunction with specific embodiments and drawings.

In order to enable those skilled in that art to better understand the embodiments of the present disclosure, the following description is made.

Figure 1:
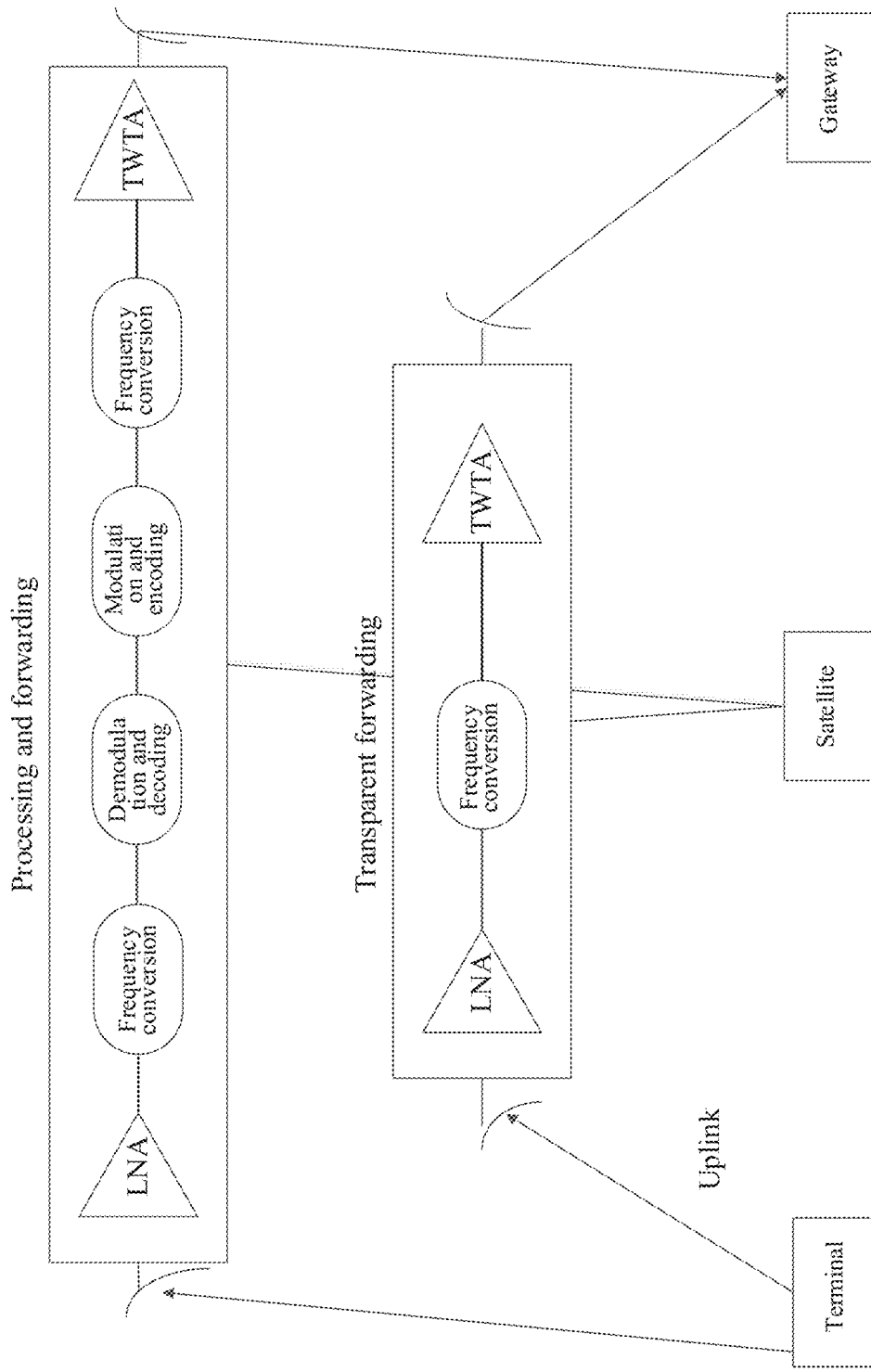
FIG. 1 is a schematic diagram of satellite communication.

In satellite communication, there are two operational modes, one of which is a bent-pipe mode, a satellite only transmit a signal transparently without any processing, a terminal communicates with a gateway station, and the other of which is a regenerative communication mode, and in this mode, the satellite can detect information of a received signal, process and forward the information, complete a function of a base station, and connect the terminal and the gateway station. In the satellite communication, connection between an end user and the satellite is called a service link, and connection between the satellite and the gateway station is a feeder link. FIG. 1 shows a schematic diagram of the two communication modes.

Figure 2:
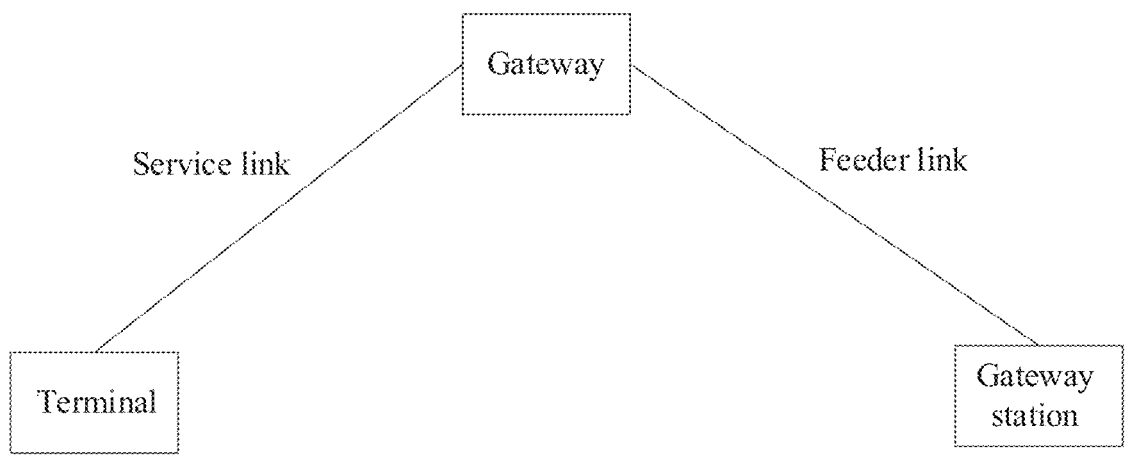
FIG. 2 is a schematic diagram of a transmission delay between a terminal and a gateway station.

In bent-pipe communication, the terminal and the gateway station will experience, when performing data transmission, a transmission delay T1 of the feeder link and a transmission delay T2 of the service link; in this case, a Round Trip Time (RTT) of the transmission is 2*(T1+T2), that is, an uplink synchronization delay is 2*(T1+T2), as shown in FIG. 2. A service link refers to a link connection between the satellite and a communication terminal, and a Feeder link refers to a link connection between a gateway station and the satellite. In the regenerative communication mode, a transmission delay between the terminal and the satellite includes the transmission delay T2 of the service link; in this case, a RTT is 2*T2. 2*(T1+T2) is a value in the order of 20~40 ms, which is relatively large. In case of a 120 kHz subcarrier spacing, at least a length of 160 slots is required.

Figure 3:
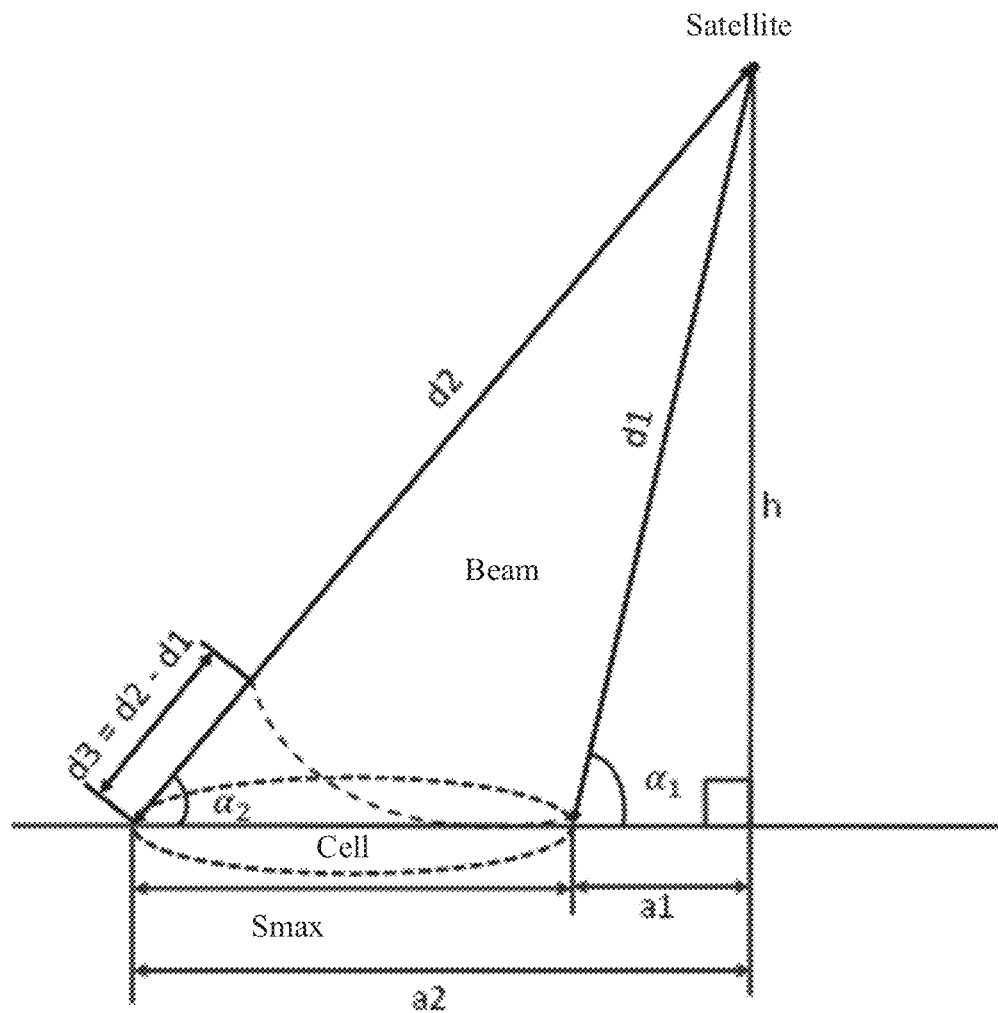
FIG. 3 is a schematic diagram of transmission delay differences of user links within a satellite cell.

Taking the bent-pipe communication as an example, uplink synchronization between the terminal and the gateway station includes two parts, the first part is that the terminal can receive GPS signals and perform accurate positioning, according to the satellite and twice of a minimum service link delay T1 (a common shortest distance for the satellite in a small area formed by beams, such as a time delay corresponding to d1 is T1 in FIG. 3) among all users plus the time delay T2 in a same beam, i.e., 2(T1+T2); the second part is, in a cell covered by the same beam, a delay (2*T3) corresponding to a difference d3 between a service link propagation path of a certain terminal and a minimum service link propagation path, as shown in FIG. 3. That is, a total uplink timing offset between the terminal and the gateway station is 2(T1+T2+T3). Considering that ae maximum diameter of a satellite cell is about 1000 km, a maximum value of 2*T3 is about 3.3 ms, and a length of at least 24 slots is required under the 120 kHz subcarrier spacing. Different terminals have different T3 values due to their different actual distances from a reference point.

In a NR system, a HARQ-ACK feedback timing is defined as that a HARQ-ACK feedback for a Physical Downlink Shared Channel (PDSCH) in a slot n is performed in a slot n+K1, where K1 represents the number of slots between the slot where the PDSCH is located and the slot where a PUCCH is located, K1 may be an integer from 0 to 15, in units of slots, that is, an interval of a maximum of 15 slots may be indicated. At most eight values of the K1 are configured to a terminal through a high-layer signaling. If only one value of K1 is configured, then the feedback timing is fixed, and if more than one value of the K1 is configured, then the K1 is dynamically indicated by a PDSCH-to-HARQ-ACK feedback timing indication field in Downlink Control Information (DCI) format used by a Physical Downlink Control Channel (PDCCH) which schedules the PDSCH. When selecting a value of the K1, it is required to ensure that a PDSCH processing delay is satisfied between an end position of the PDSCH and a start position of the PUCCH, wherein the start position of the PUCCH is a start position with a TA being considered. Therefore, a support for different processing delays and TAs is realized by selecting a value of the K1 reasonably in the NR. In the NR system, in a slot for HARQ-ACK transmission, a HARQ-ACK codebook is determined based on a K1 set, that is, a HARQ-ACK codebook is a HARQ-ACK sequence containing feedback information of one or more PDSCHs transmitted in a slot.

In a satellite communication system, if it is intended to reuse the K1 in NR to define a timing between a PDSCH and a PUCCH transmitting the HARQ-ACK for the PDSCH, it is obvious that the value of K1 defined by the NR in the related art cannot support the significant TA in the satellite communication system. A simple implementation is to define the feedback timing by n+K1+TA_offset, that is, to introduce an offset value related to the TA to support the significant TA that the K1 cannot support. In this manner, there are two interpretations for the TA_offset, one is a TA value covering all uplink timing offsets from the terminal to the gateway station, i.e., an absolute TA value of 2*(T1+T2+T3); in this case, a slot of terminal transmission determined according to the TA_offset can be identical to a slot index maintained by the gateway station when the transmission arrives at the gateway station, but the value of the TA_offset is very large. Another interpretation is that the TA_offset corresponds to only the uplink timing offset of a reference point, in a cell corresponding to a satellite beam, of the terminal, i.e., a relative TA value is 2*T3. In this case, an offset between an index of an uplink slot determined according to this TA_offset and an index of a slot maintained by the gateway station is fixed to be the number of slots corresponding to 2*(T1+T2).

In the satellite communication system, when a feedback slot is determined based on an interval compensated based on the TA, there is no clear method for how to determine the HARQ-ACK codebook transmitted in the feedback slot.

Figure 4:
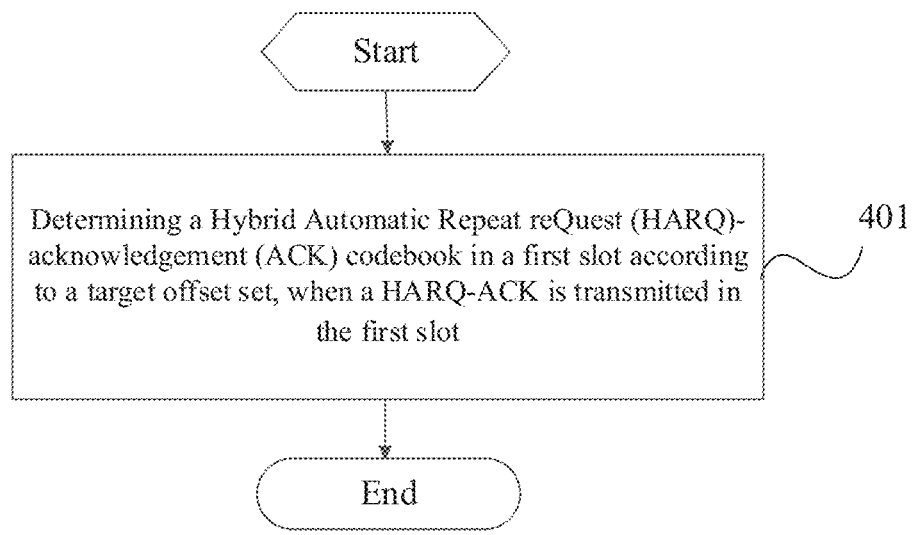
FIG. 4 is a first flowchart of a method of determining a HARQ-ACK codebook according to some embodiments of the present disclosure.

An embodiment of the present disclosure provides a method of determining a Hybrid Automatic Repeat reQuest (HARQ)-acknowledgement (ACK) codebook. The method of determining the HARQ-ACK is applied to a terminal, and as shown in FIG. 4, the method includes a step 401.

Step 401: determining a Hybrid Automatic Repeat reQuest (HARQ)-acknowledgement (ACK) codebook in a first slot according to a target offset set, when a HARQ-ACK is transmitted in the first slot;

The HARQ-ACK is a HARQ-ACK for a Physical Downlink Shared Channel (PDSCH) transmitted in a second slot or a HARQ-ACK for a Semi-Persistently Scheduled (SPS) PDSCH release transmitted in a second slot, that is, the HARQ-ACK transmitted in the first slot is an HARQ-ACK of the PDSCH transmitted in the second slot, or HARQ-ACK for the SPS PDSCH release transmitted in the second slot.

The target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the K1 set, n_U is an index of the first slot, n is an index of the second slot.

The K1 set is a set including at least one integer value greater than or equal to 0, elements in the K1 set are in a first time unit, and TA_offset is in a second time unit. The first time unit and the second time unit are the same or different. The first time unit or the second time unit may be specifically A subframes, A slots, or A sub-slots, wherein the sub-slot is a predefined or configured time unit having a fixed length, such as B symbols (OFDM symbols).

In the embodiments of the present disclosure, it is assumed that the index of an uplink slot is numbered in a manner of being a TA time ahead of the index of a downlink slot (TA advance is not required because the index of the slot itself is already advanced by the TA time, that is, HARQ-ACK transmission can be directly performed according to the slot determined by the feedback timing), wherein TA=TA_offset (for example, in this case, TA_offset is used to compensate a timing difference relative to the reference point within the satellite cell, TA_offset is used to compensate for the timing difference from the terminal to the gateway station through the satellite), or TA is greater than TA_offset (for example, in this case, TA_offset is used to compensate for the timing difference relative to the reference point within the satellite cell, but a real TA needs to compensate for the timing difference from the terminal to the gateway station through the satellite).

Optionally, it is assumed that the index of an uplink slot is numbered in a manner that the uplink slot is aligned with a downlink slot (that is, it is assumed that sub-carrier spacings in uplink and in downlink are the same, boundaries of an uplink slot n and an downlink slot n are aligned, the Timing Advance TA is not required to define a condition of the uplink slot n, then during actual transmission, an uplink slot, not a real slot, is determined accord to the feedback timing, the actual slot needs to be transmitted ahead of the TA time on the basis of the uplink slot).

According to the above technical solutions of the embodiments of the present disclosure, when the HARQ-ACK is transmitted in the first slot, the HARQ-ACK codebook in the first slot is determined according to the target offset set W=K1+TA_offset, thereby ensuring that the HARQ-ACK codebook correctly includes PDSCH candidate positions corresponding to HARQ-ACK feedbacks required to be performed in the first slot, and ensuring normal transmission of the HARQ-ACKs.

Further, determining the HARQ-ACK codebook in the first slot according to the target offset set includes: determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot; obtaining the HARQ-ACK codebook in the first slot according to the candidate PDSCH opportunity set corresponding to each carrier.

Here, the HARQ-ACK codebook corresponding to each carrier is obtained according to the candidate PDSCH opportunity set corresponding to each carrier, and the HARQ-ACK codebooks corresponding to carriers are concatenated according to a first preset order, the HARQ-ACK codebook in the first slot is obtained. The first preset order may specifically be an arrangement order according to carrier coding values from small to large.

Specifically, determining the candidate PDSCH opportunity set corresponding to each carrier according to the target offset set includes at least one of the following first and second manners.

A first manner includes following:

obtaining each downlink slot corresponding to the first slot according to $n\_U-w_i$; obtaining the candidate PDSCH opportunity set corresponding to each carrier according to the each downlink slot; where $w_i$ belongs to W, i=0, 1, ..., T-1, T is the number of elements in W (that is, according to the above determination method, the set of W is determined, $w_i$ is each element in the set), or $w_i=k_i+$TA_offset. $k_i$ belongs to K1, i=0, 1, ..., T-1, T is the number of elements in K1 (i.e. similar to the definition of W in which each element $w_i$ in the W is obtained from $k_i$+TA_offset).

In this first manner, for an i-th $w_i$, a downlink slot corresponding to the first slot is obtained according to $n\_U-w_i$, so that T downlink slots are determined to correspond to the first slot. Then, the candidate PDSCH opportunity set corresponding to each carrier is obtained according to PDSCH transmission opportunities in the T downlink slots.

Further, for the above first manner, obtaining the candidate PDSCH opportunity set corresponding to each carrier according to each downlink slot includes: determining the each downlink slot as a candidate PDSCH opportunity; or, determining whether each downlink slot includes a valid SLIV as a PDSCH time-domain transmission position, and taking each downlink slot including the valid SLIV (Start and Length Indicator Value) as a candidate PDSCH opportunity; or, determining each downlink slot as a candidate PDSCH opportunity if receiving more than one PDSCH in one slot is not supported, and determining, for the each downlink slot, at least one SLIV group according to an overlapping rule of SLIVs in a slot, and taking each SLIV group as a candidate PDSCH opportunity if receiving more than one PDSCH in one slot is supported; or, determining whether the each downlink slot includes a valid SLIV as a PDSCH time-domain transmission position, and taking each downlink slot including the valid SLIV as one candidate PDSCH opportunity if receiving more than one PDSCH in one slot is not supported, or determining, for each downlink slot including a valid SLIV, at least one SLIV group according to an overlapping rule of valid SLIVs in one slot, and taking each SLIV group as a candidate PDSCH opportunity, if receiving more than one PDSCH in one slot is supported.

Further, in the above first manner, determining whether the SLIV is valid includes: when a time-domain symbol corresponding to the SLIV overlaps with at least one uplink symbol in a corresponding downlink slot, determining that the SLIV is an invalid SLIV, otherwise, determining that the SLIV is a valid SLIV In particular, if it is always assumed in the satellite communication system that there is only at most one PDSCH transmission in each downlink slot (i.e., if each DL slot corresponds to a plurality of SLIVs, then the plurality of SLIVs are overlapped, and only one SLIV is selected for PDSCH transmission, and thus these SLIVs correspond to the same candidate PDSCH opportunity), each downlink slot can be directly treated as one candidate PDSCH opportunity, and T candidate PDSCH opportunities are determined to constitute a candidate PDSCH opportunity set $M_{A,c}$ for a carrier c; if receiving more than one PDSCH transmission in one slot can be supported in the satellite communication system, then whether a capability of receiving more than one PDSCH transmission in one slot is supported is configurable, $M_{A,c}$ is determined according whether the capability of receiving more than one PDSCH transmission in one slot is configured; if receiving more than one PDSCH transmission in one slot is not supported, i.e., receiving at most one PDSCH in one slot, then each downlink slot can be directly taken as one candidate PDSCH opportunity, T candidate PDSCH opportunities are determined to constitute a candidate PDSCH opportunity set $M_{A,c}$ of the carrier c; if receiving more than one PDSCH transmission in one slot is supported, then it means that there may be a plurality of candidate PDSCH opportunities in one slot, then these opportunities may be determined according to a distribution of SLIVs in one slot, that is, multiple SLIVs in a candidate SLIV set corresponding to one slot may or may not overlap in time domain, and these SLIVs are grouped according to an overlapping rule to obtain multiple non-overlapping candidate PDSCH opportunities as candidate PDSCH opportunities corresponding to one slot, so that for T slots, T candidate PDSCH opportunities may be determined to constitute the candidate PDSCH opportunity set $M_{A,c}$ for the carrier c; further, whether a SLIV is valid or not may be further judged according to whether the SLIV overlaps with an uplink symbol, and an invalid SLIV is removed from a SLIV set, only an valid SLIV is kept to determine candidate PDSCH opportunities in the above manner.

An overlapping rule of SLIVs is as follows.

Step 1: determining each element (SLIV) in a PDSCH time-domain resource allocation table as a set R.

Step 2: searching an element X with an earliest ending position in the R.

Step 3: searching all elements (including the element X), in the R, start symbols of which are earlier than the ending position, wherein these elements overlap in time domain, and thus cannot be scheduled at the same time.

Step 4: the elements obtained in step 1 and step 2 corresponding to one PDSCH transmission opportunity, removing, from the set R, the elements obtained in step 1 and step 2, and returning to step 2 until R does not contain any element.

Figure 5:
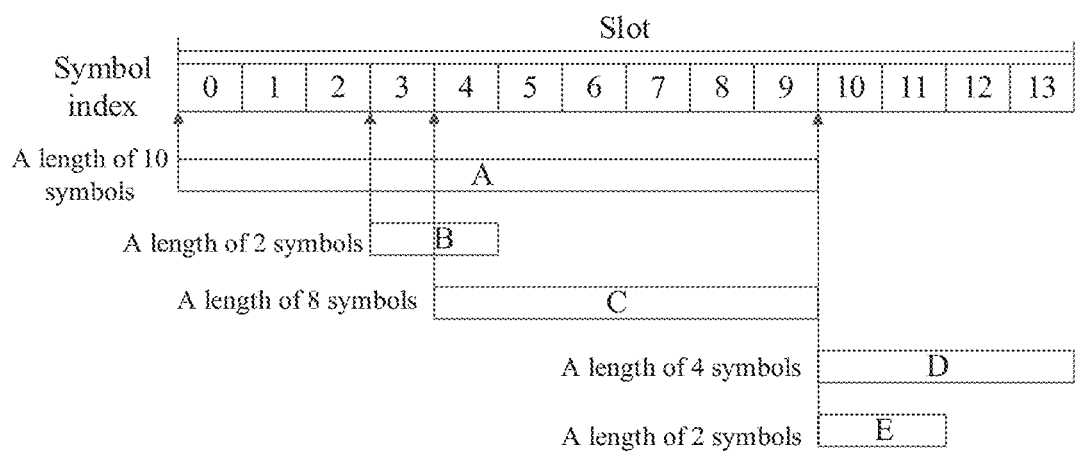
FIG. 5 is a schematic diagram of elements in a SLIV set.

Specifically, as shown in FIG. 5, it is assumed that the SLIV set includes five elements A to E, wherein the element A corresponds to a start symbol 0 and has 10 symbols in length; the element B corresponds to a start symbol 3 and has 2 symbols in length; the element C corresponds to a start symbol 4 and has 8 symbols in length; the element D corresponds to a start symbol 10 and has 4 symbols in length, and the element E corresponds to the start symbol 10 and has 2 symbols in length. First, the element B having the earliest ending position is found, and all elements, start symbols of which are earlier than the element B having the earliest ending position, among the remaining elements are found out, the found elements include the elements A/B/C. Hence only one PDSCH of the element A/B/C can be scheduled, this corresponds to one candidate PDSCH opportunity. The element E has the earliest ending position, among remaining elements; the start symbol of the element D is earlier than the element E, and thus only one PDSCH of the element D/E can be scheduled, this corresponds to one candidate PDSCH opportunity. In this example, the maximum number of PDSCHs that can be received by the UE in one slot is 2.

A Second Manner Includes Following:

obtaining each group of downlink slots corresponding to the first slot according to $n\_U-w_i-S$, wherein each group of downlink slots includes at least one downlink slot; obtaining a candidate PDSCH opportunity set corresponding to each carrier according to each group of downlink slots; wherein S=0, 1, ..., Krept-1, Krept is the number of repetition transmissions of PDSCH, and Krept=1 when repetition transmission is not configured; $w_i$ belongs to W, i=0, 1, ..., T-1, T is the number of elements in W, or $w_i=k_i+TA\_offset$, $k_i$ belongs to K1, i=0, 1, ..., T-1, T is the number of elements in K1.

In the second manner, for an i-th $w_i$, a group of downlink slots corresponding to the first slot is obtained according to $n\_U-w_i-S$, where S has Krept values. The group of downlink slots is a group of downlink slots for transmitting repeatedly the PDSCH for Krept times, thereby determining T groups of downlink slots corresponding to the first slot. Then, a candidate PDSCH opportunity set corresponding to each carrier is obtained according to PDSCH transmission opportunities in the T group of downlink slots.

For the above second manner, obtaining the candidate PDSCH opportunity set corresponding to each carrier according to each group of downlink slots includes: determining, for each group of downlink slots, whether one SLIV in the SLIV set is valid in each downlink slot in the group of downlink slots, and when a valid SLIV is included in the SLIV set, determining the each group of downlink slots as one candidate PDSCH opportunity; or, determining, for each group of downlink slots, whether one SLIV in the SLIV set is valid in each downlink slot in the each group of downlink slots; and when a valid SLIV is included in the SLIV set, and determining each group of downlink slots as a candidate PDSCH opportunity if receiving more than one PDSCH in one slot is not supported, or determining at least one SLIV group according to the overlapping rule of valid SLIVs, and taking each SLIV group as a candidate PDSCH opportunity, if receiving more than one PDSCH in one slot is supported.

Further, for the above second manner, determining whether the SLIV is valid includes: determining that the SLIV is an invalid SLIV when a time-domain symbol corresponding to the SLIV overlaps with at least one uplink symbol in any downlink slot of a corresponding group of downlink slots; otherwise (i.e., in each downlink slot of a corresponding group of downlink slots, a time-domain symbol corresponding to the SLIV does not overlap with an uplink symbol), determining the SLIV as a valid SLIV.

In particular, if it is always assumed in the satellite communication system that there is only at most one PDSCH transmission in each downlink slot (i.e., if each DL slot corresponds to a plurality of SLIVs, then the plurality of SLIVs are overlapped, and there is only one SLIV being selected for PDSCH transmission, and thus these SLIVs correspond to the same candidate PDSCH opportunity), each group of downlink slots can be directly used as one candidate PDSCH opportunity, T candidate PDSCH opportunities are determined to constitute a set $M_{A,c}$ of candidate PDSCH opportunities for the carrier c; if more than one PDSCH transmission can be received in one slot can be supported in the satellite communication system, then whether the capability of receiving more than one PDSCH transmission is supported is configurable, $M_{A,c}$ may be determined depending on whether this capability is configured; if the capability of receiving more than one PDSCH transmission is not supported, i.e., receiving at most one PDSCH in one slot is supported, then a group of downlink slots can be directly taken as one candidate PDSCH opportunity, T candidate PDSCH opportunities are determined to constitute a set $M_{A,c}$ of candidate PDSCH opportunities for the carrier c; if receiving more than one PDSCH in one slot is supported, it means that a plurality of candidate PDSCH opportunities may exist in one slot, these candidate PDSCH opportunities may be determined according to a distribution of SLIVs in one slot, that is, multiple SLIVs in a candidate SLIV set corresponding to one slot may or may not overlap in time domain, and these SLIVs are grouped according to the overlap rule (the same as above), and a plurality of non-overlapping candidate PDSCH opportunities can be obtained as candidate PDSCH opportunities corresponding to a group of slots, so that for T groups of slots, T candidate PDSCH opportunities may be determined to constitute a set $M_{A,c}$ of candidate PDSCH opportunities for the carrier c. Further, whether one SLIV is valid or not may be further judged by determining whether the SLIV overlaps with an uplink symbol, and an invalid SLIV is removed from the SLIV set, and only valid SLIVs are kept for determining the candidate PDSCH opportunity in the above manner.

If a plurality of carriers exist, then the set $M_{A,c}$ is determined for each carrier in the above manner, and a HARQ-ACK codebook for this carrier is determined based on the set $M_{A,c}$ HARQ-ACK codebooks of the plurality of carriers are concatenated together in an order of carrier indexes from small to large, and a final HARQ-ACK codebook is obtained.

Further, determining the HARQ-ACK codebook in the first slot according to the target offset set includes: when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH transmission and a slot of a PDSCH transmission scheduled by the PDCCH; detecting a PDCCH in an entirety set of the PDCCH detection opportunity set corresponding to each carrier, and determining an HARQ-ACK codebook in the first slot according to a Downlink Allocation Index (DAI) value in the detected PDCCH.

In a case that there are a plurality of carriers, PDCCH detection opportunity sets corresponding to the carriers are sequenced in a second preset order, to generate a final PDCCH detection opportunity set, and a PDCCH is detected in the final PDCCH detection opportunity set; and the HARQ-ACK codebook in the first slot is determined according to a Downlink Allocation Index DAI value in the detected PDCCH. The second preset order may be an arrangement order in which PDCCH detection opportunity sets in a time domain are arranged first and PDCCH detection opportunity sets in a frequency domain is arranged thereafter.

Determining the PDCCH detection opportunity set corresponding to each carrier according to the target offset set and the K0 set includes: obtaining each downlink slot corresponding to the first slot according to $n\_U-w_i$; determining, according to the K0 set, a PDCCH detection opportunity corresponding to the each downlink slot; determining the PDCCH detection opportunity set corresponding to each carrier according to a PDCCH detection opportunity set corresponding to each downlink slot; wherein, the PDCCH detection opportunity corresponding to each downlink slot is a PDCCH detection opportunity in a slot having a slot index=$n\_U-w_i k_{0,j}$, $w_i$ belongs to W, i=0, 1, . . . , T-1, T is the number of elements in W, or $w_i=k_i+TA\_offset$, $k_i$ belongs to K1, i=0, 1, . . . , T-1. T is the number of elements in K1, $k_{0,j}$ belongs to the K0 set, j=0, 1, . . . , P-1, P is the number of elements in the K0 set.

Further, determining the PDCCH detection opportunity corresponding to each downlink slot according to the K0 set includes: determining, according to $n\_U-w_i-k_{0,j}$, a slot in which the PDCCH detection opportunity corresponding to each downlink slot is located; determining, as the PDCCH detection opportunity corresponding to the downlink slot, the PDCCH detection opportunity in the slot numbered $n\_U-w_i-k_{0,j}$.

Further, determining the PDCCH detection opportunity corresponding to each downlink slot according to the K0 set includes: determining whether each downlink slot is a valid slot; when the downlink slot is a valid slot, determining a PDCCH detection opportunity corresponding to the downlink slot according to the K0 set.

Here, for each valid slot in each downlink slot, the corresponding PDCCH detection opportunity is determined based on the K0 set, that is, a PDCCH detection opportunity corresponding to an invalid slot is not determined based on the K0 set.

Determining whether each downlink slot is a valid slot includes: determining whether the SLIV in the downlink slot is a valid SLIV; if all SLIVs in the downlink slot are invalid SLIVs, determining the downlink slot as an invalid slot, otherwise, determining the downlink slot as a valid downlink slot.

Further, determining the PDCCH detection opportunity set corresponding to each carrier according to the target offset set and the K0 set includes: when the number Krept of repetition transmissions of PDSCH is configured, determining the PDCCH detection opportunity set corresponding to each carrier according to the target offset set, the K0 set, and the number of repetition transmissions.

In a specific embodiment of the present disclosure, if the number Krept of repetition transmissions of PDSCH is configured, the PDCCH detection opportunity set corresponding to each carrier needs to be further determined according to the target offset set, the K0 set and the number of repetition transmissions.

Specifically, on the basis of determining the PDCCH detection opportunity according to $n\_U-w_i$, the first slot $n\_U-w_i-(Krept-1)$ in slots for repetition transmissions of PDSCH needs to further be determined for each $w_i$ according to the number of repetition transmission, and a slot $n\_U-w_i-(Krept-1)-k_{0,j}$ in which a PDCCH detection opportunity corresponding to $n\_U-w_i-(Krept-1)$ is located is determined based on the K0 set; the PDCCH detection opportunity in the slot $n\_U-w_i-(Krept-1)-k_{0,j}$ is also determined as the PDCCH detection opportunity corresponding to the carrier.

Further, after determining the HARQ-ACK codebook in the first slot according to the target offset set, the method further includes: sending the HARQ-ACK codebook through a Physical Uplink Control Channel (PUCCH) or a Physical Uplink Shared Channel (PUSCH) in the first slot.

In the method of determining a Hybrid Automatic Repeat reQuest acknowledgement codebook of the present disclosure, when the Hybrid Automatic Repeat reQuest acknowledgement (HARQ-ACK) is transmitted in the first slot, the HARQ-ACK codebook in the first slot is determined according to the target offset set $W=K1+TA\_offset$. In this way, it may be ensured that the HARQ-ACK codebook correctly includes PDSCH candidate positions corresponding to HARQ-ACK feedback required to be performed in the first slot, thereby ensuring normal transmissions of HARQ-ACKs.

Figure 6:
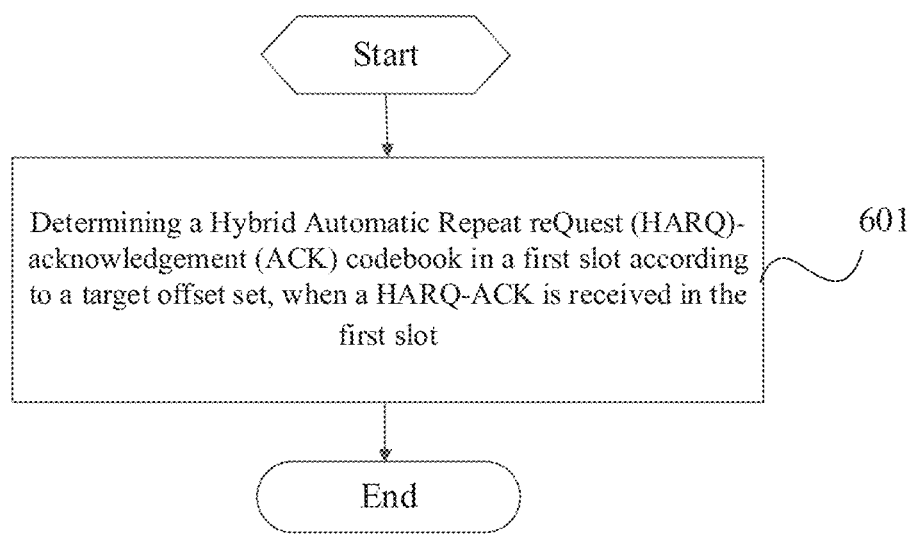
FIG. 6 is a second flowchart of a method of determining a HARQ-ACK codebook according to some embodiments of the present disclosure.

Some embodiments of the present disclosure also provide a method of determining a Hybrid Automatic Repeat reQuest (HARQ) acknowledgement codebook. The method is applied to a network device, and as shown in FIG. 6, the method includes a step 601.

Step 601: determining a Hybrid Automatic Repeat reQuest (HARQ)-acknowledgement (ACK) codebook in a first slot according to a target offset set, when a HARQ-ACK is received in the first slot.

The HARQ-ACK is a HARQ-ACK for a Physical Downlink Shared Channel (PDSCH) transmitted in a second slot or a HARQ-ACK for a Semi-Persistently Scheduled (SPS) PDSCH release transmitted in a second slot. The target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the K1 set, n_U is an index of the first slot, n is an index of the second slot.

The K1 set is a set including at least one integer value greater than or equal to 0, elements in the K1 set are in a first time unit, and TA_offset is in a second time unit. The first time unit and the second time unit are the same or different. The first time unit or the second time unit may be specifically A subframes, A slots, or A sub-slots, wherein the sub-slot is a predefined or configured time unit having a fixed length, such as B symbols (OFDM symbols).

In the embodiments of the present disclosure, it is assumed that the index of an uplink slot is numbered in a manner of being a TA time ahead of the index of a downlink slot (TA advance is not required because the index of the slot itself is already advanced by the TA time, that is, HARQ-ACK transmission can be directly performed according to the slot determined by the feedback timing), wherein TA=TA_offset (for example, in this case, TA_offset is used to compensate a timing difference relative to the reference point within the satellite cell, TA_offset is used to compensate for the timing difference from the terminal to the gateway station through the satellite), or TA is greater than TA_offset (for example, in this case, TA_offset is used to compensate for the timing difference relative to the reference point within the satellite cell, but a real TA needs to compensate for the timing difference from the terminal to the gateway station through the satellite.

Optionally, it is assumed that the index of an uplink slot is numbered in a manner that the uplink slot is aligned with a downlink slot (that is, it is assumed that sub-carrier spacings in uplink and in downlink are the same, boundaries of an uplink slot n and an downlink slot n are aligned, the Timing Advance TA is not required to define a condition of the uplink slot n, then during actual transmission, an uplink slot, not a real slot, is determined accord to the feedback timing, the actual slot needs to be transmitted ahead of the TA time on the basis of the uplink slot).

According to the above technical solutions of the embodiments of the present disclosure, when the HARQ-ACK is transmitted in the first slot, the HARQ-ACK codebook in the first slot is determined according to the target offset set W=K1+TA_offset, thereby ensuring that the HARQ-ACK codebook correctly includes PDSCH candidate positions corresponding to HARQ-ACK feedbacks required to be performed in the first slot, and ensuring normal transmission of the HARQ-ACKs.

Further, determining the HARQ-ACK codebook in the first slot according to the target offset set includes: determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot; obtaining the HARQ-ACK codebook in the first slot according to the candidate PDSCH opportunity set corresponding to each carrier.

Here, the HARQ-ACK codebook corresponding to each carrier is obtained according to the candidate PDSCH opportunity set corresponding to each carrier, and the HARQ-ACK codebooks corresponding to carriers are concatenated according to a first preset order, the HARQ-ACK codebook in the first slot is obtained. The first preset order may specifically be an arrangement order according to carrier coding values from small to large.

Specifically, determining the candidate PDSCH opportunity set corresponding to each carrier according to the target offset set includes at least one of the following first and second manners.

A first manner includes following:

obtaining each downlink slot corresponding to the first slot according to n_U−$w_i$; obtaining the candidate PDSCH opportunity set corresponding to each carrier according to the each downlink slot; where $w_i$ belongs to W, i=0, 1, . . . , T-1, T is the number of elements in W (that is, according to the above determination method, the set of W is determined, $w_i$ is each element in the set), or $w_i$=$k_i$+TA_offset. $k_i$ belongs to K1, i=0, 1, . . . , T-1, T is the number of elements in K1 (i.e. similar to the definition of W in which each element $w_i$ in the W is obtained from $k_i$+TA_offset).

In this first manner, for an i-th $w_i$, a downlink slot corresponding to the first slot is obtained according to n_U−$w_i$, so that T downlink slots are determined to correspond to the first slot. Then, the candidate PDSCH opportunity set corresponding to each carrier is obtained according to PDSCH transmission opportunities in the T downlink slots.

Further, for the above first manner, obtaining the candidate PDSCH opportunity set corresponding to each carrier according to each downlink slot includes: determining the each downlink slot as a candidate PDSCH opportunity; or, determining whether each downlink slot includes a valid SLIV as a PDSCH time-domain transmission position, and taking each downlink slot including the valid SLIV as a candidate PDSCH opportunity; or, determining each downlink slot as a candidate PDSCH opportunity if receiving more than one PDSCH in one slot is not supported, and determining, for the each downlink slot, at least one SLIV group according to an overlapping rule of SLIVs in a slot, and taking each SLIV group as a candidate PDSCH opportunity, if receiving more than one PDSCH in one slot is supported; or, determining whether the each downlink slot includes a valid SLIV as a PDSCH time-domain transmission position, and taking each downlink slot including the valid SLIV as one candidate PDSCH opportunity if receiving more than one PDSCH in one slot is not supported, or determining, for each downlink slot including a valid SLIV, at least one SLIV group according to an overlapping rule of valid SLIVs in one slot, and taking each SLIV group as a candidate PDSCH opportunity, if receiving more than one PDSCH in one slot is supported.

Further, in the above first manner, determining whether the SLIV is valid includes: when a time-domain symbol corresponding to the SLIV overlaps with at least one uplink symbol in a corresponding downlink slot, determining that the SLIV is an invalid SLIV, otherwise, determining that the SLIV is a valid SLIV In particular, if it is always assumed in the satellite communication system that there is only at most one PDSCH transmission in each downlink slot (i.e., if each DL slot corresponds to a plurality of SLIVs, then the plurality of SLIVs are overlapped, and only one SLIV is selected for PDSCH transmission, and thus these SLIVs correspond to the same candidate PDSCH opportunity), each downlink slot can be directly treated as one candidate PDSCH opportunity, and T candidate PDSCH opportunities are determined to constitute a candidate PDSCH opportunity set $M_{A,c}$ for a carrier c; if receiving more than one PDSCH transmission in one slot can be supported in the satellite communication system, then whether the capability of receiving more than one PDSCH transmission in one slot is supported is configurable, $M_{A,c}$ is determined according whether the capability of receiving more than one PDSCH transmission in one slot is configured; if receiving more than one PDSCH transmission in one slot is not supported, i.e., receiving at most one PDSCH in one slot, then each downlink slot can be directly taken as one candidate PDSCH opportunity, T candidate PDSCH opportunities are determined to constitute a candidate PDSCH opportunity set $M_{A,c}$ of the carrier c; if receiving more than one PDSCH transmission in one slot is supported, then it means that there may be a plurality of candidate PDSCH opportunities in one slot, then these opportunities may be determined according to a distribution of SLIVs in one slot, that is, multiple SLIVs in a candidate SLIV set corresponding to one slot may or may not overlap in time domain, and these SLIVs are grouped according to an overlapping rule to obtain multiple non-overlapping candidate PDSCH opportunities as candidate PDSCH opportunities corresponding to one slot, so that for T slots, T candidate PDSCH opportunities may be determined to constitute the candidate PDSCH opportunity set $M_{A,c}$ for the carrier c; further, whether a SLIV is valid or not may be further judged according to whether the SLIV overlaps with an uplink symbol, and an invalid SLIV is removed from a SLIV set, only an valid SLIV is kept to determine candidate PDSCH opportunities in the above manner.

An overlapping rule of SLIVs is as follows.

Step 1: determining each element (SLIV) in a PDSCH time-domain resource allocation table as a set R.

Step 2: searching an element X with an earliest ending position in the R.

Step 3: searching all elements (including the element X), in the R, start symbols of which are earlier than the ending position, wherein these elements overlap in time domain, and thus cannot be scheduled at the same time.

Step 4: the elements obtained in step 1 and step 2 corresponding to one PDSCH transmission opportunity, removing, from the set R, the elements obtained in step 1 and step 2, and returning to step 2 until R does not contain any element.

Specifically, as shown in FIG. 5, it is assumed that the SLIV set includes five elements A to E, wherein the element A corresponds to a start symbol 0 and has 10 symbols in length; the element B corresponds to a start symbol 3 and has 2 symbols in length; the element C corresponds to a start symbol 4 and has 8 symbols in length; the element D corresponds to a start symbol 10 and has 4 symbols in length, and the element E corresponds to the start symbol 10 and has 2 symbols in length. First, the element B having the earliest ending position is found, and all elements, start symbols of which are earlier than the element B having the earliest ending position, among the remaining elements are found out, the found elements include the elements A/B/C. Hence only one PDSCH of the element A/B/C can be scheduled, this corresponds to one candidate PDSCH opportunity. The element E has the earliest ending position, among remaining elements; the start symbol of the element D is earlier than the element E, and thus only one PDSCH of the element D/E can be scheduled, this corresponds to one candidate PDSCH opportunity. In this example, the maximum number of PDSCHs that can be received by the UE in one slot is 2.

A Second Manner Includes Following:

obtaining each group of downlink slots corresponding to the first slot according to n_U-$w_i$-S, wherein each group of downlink slots includes at least one downlink slot; obtaining a candidate PDSCH opportunity set corresponding to each carrier according to each group of downlink slots; wherein S=0, 1, . . . , Krept-1, Krept is the number of repetition transmissions of PDSCH, and Krept=1 when repetition transmission is not configured; $w_i$ belongs to W, i=0, 1, . . . , T-1, T is the number of elements in W, or $w_i$=$k_i$+TA_offset, $k_i$ belongs to K1, i=0, 1, . . . , T-1, T is the number of elements in K1.

In the second manner, for an i-th $w_i$, a group of downlink slots corresponding to the first slot is obtained according to n_U-$w_i$-S, where S has Krept values. The group of downlink slots is a group of downlink slots for transmitting repeatedly the PDSCH for Krept times, thereby determining T groups of downlink slots corresponding to the first slot. Then, a candidate PDSCH opportunity set corresponding to each carrier is obtained according to PDSCH transmission opportunities in the T group of downlink slots.

For the above second manner, obtaining the candidate PDSCH opportunity set corresponding to each carrier according to each group of downlink slots includes: determining, for each group of downlink slots, whether one SLIV in the SLIV set is valid in each downlink slot in the group of downlink slots, and when a valid SLIV is included in the SLIV set, determining the each group of downlink slots as one candidate PDSCH opportunity; or, determining, for each group of downlink slots, whether one SLIV in the SLIV set is valid in each downlink slot in the each group of downlink slots; and when a valid SLIV is included in the SLIV set, and determining each group of downlink slots as a candidate PDSCH opportunity if receiving more than one PDSCH in one slot is not supported, or determining at least one SLIV group according to the overlapping rule of valid SLIVs, and taking each SLIV group as a candidate PDSCH opportunity, if receiving more than one PDSCH in one slot is supported.

Further, for the above second manner, determining whether the SLIV is valid includes: determining that the SLIV is an invalid SLIV when a time-domain symbol corresponding to the SLIV overlaps with at least one uplink symbol in any downlink slot of a corresponding group of downlink slots; otherwise (i.e., in each downlink slot of a corresponding group of downlink slots, a time-domain symbol corresponding to the SLIV does not overlap with an uplink symbol), determining the SLIV as a valid SLIV.

In particular, if it is always assumed in the satellite communication system that there is only at most one PDSCH transmission in each downlink slot (i.e., if each DL slot corresponds to a plurality of SLIVs, then the plurality of SLIVs are overlapped, and there is only one SLIV being selected for PDSCH transmission, and thus these SLIVs correspond to the same candidate PDSCH opportunity), each group of downlink slots can be directly used as one candidate PDSCH opportunity, T candidate PDSCH opportunities are determined to constitute a set $M_{A,c}$ of candidate PDSCH opportunities for the carrier c; if more than one PDSCH transmission can be received in one slot can be supported in the satellite communication system, then whether the capability of receiving more than one PDSCH transmission is supported is configurable, $M_{A,c}$ may be determined depending on whether this capability is configured; if the capability of receiving more than one PDSCH transmission is not supported, i.e., receiving at most one PDSCH in one slot is supported, then a group of downlink slots can be directly taken as one candidate PDSCH opportunity, T candidate PDSCH opportunities are determined to constitute a set $M_{A,c}$ of candidate PDSCH opportunities for the carrier c; if receiving more than one PDSCH in one slot is supported, it means that a plurality of candidate PDSCH opportunities may exist in one slot, these candidate PDSCH opportunities may be determined according to a distribution of SLIVs in one slot, that is, multiple SLIVs in a candidate SLIV set corresponding to one slot may or may not overlap in time domain, and these SLIVs are grouped according to the overlap rule (the same as above), and a plurality of non-overlapping candidate PDSCH opportunities can be obtained as candidate PDSCH opportunities corresponding to a group of slots, so that for T groups of slots, T candidate PDSCH opportunities may be determined to constitute a set $M_{A,c}$ of candidate PDSCH opportunities for the carrier c. Further, whether one SLIV is valid or not may be further judged by determining whether the SLIV overlaps with an uplink symbol, and an invalid SLIV is removed from the SLIV set, and only valid SLIVs are kept for determining the candidate PDSCH opportunity in the above manner.

If a plurality of carriers exist, then the set $M_{A,c}$ is determined for each carrier in the above manner, and a HARQ-ACK codebook for this carrier is determined based on the set $M_{A,c}$. HARQ-ACK codebooks of the plurality of carriers are concatenated together in an order of carrier indexes from small to large, and a final HARQ-ACK codebook is obtained.

Further, determining the HARQ-ACK codebook in the first slot according to the target offset set includes: when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH transmission and a slot of a PDSCH transmission scheduled by the PDCCH; transmitting a PDCCH in at least one PDCCH detection opportunity in an entirety set of the PDCCH detection opportunity set corresponding to each carrier, and determining an HARQ-ACK codebook in the first slot according to a Downlink Allocation Index (DAI) value in the transmitted PDCCH.

In a case that there are a plurality of carriers, PDCCH detection opportunity sets corresponding to the carriers are sequenced in a second preset order, to generate a final PDCCH detection opportunity set, and a PDCCH is detected in the final PDCCH detection opportunity set; and the HARQ-ACK codebook in the first slot is determined according to a Downlink Allocation Index DAI value in the detected PDCCH. The second preset order may be an arrangement order in which PDCCH detection opportunity sets in a time domain are arranged first and PDCCH detection opportunity sets in a frequency domain is arranged thereafter.

Determining the PDCCH detection opportunity set corresponding to each carrier according to the target offset set and the K0 set includes: obtaining each downlink slot corresponding to the first slot according to $n\_U-w_i$; determining, according to the K0 set, a PDCCH detection opportunity corresponding to the each downlink slot; determining the PDCCH detection opportunity set corresponding to each carrier according to a PDCCH detection opportunity set corresponding to each downlink slot; wherein, the PDCCH detection opportunity corresponding to each downlink slot is a PDCCH detection opportunity in a slot having a slot index=$n\_U-w_i-k_{0,j}$, $w_i$ belongs to W, i=0, 1, ..., T-1, T is the number of elements in W, or $w_i=k_i+TA\_offset$, $k_i$ belongs to K1, i=0, 1, ..., T-1. T is the number of elements in K1, $k_{0,j}$ belongs to the K0 set, j=0, 1, ..., P-1, P is the number of elements in the K0 set.

Further, determining the PDCCH detection opportunity corresponding to each downlink slot according to the K0 set includes: determining, according to $n\_U-w_i-k_{0,j}$, a slot in which the PDCCH detection opportunity corresponding to each downlink slot is located; determining, as the PDCCH detection opportunity corresponding to the downlink slot, the PDCCH detection opportunity in the slot numbered $n\_U-w_i-k_{0,j}$.

Further, determining the PDCCH detection opportunity corresponding to each downlink slot according to the K0 set includes: determining whether each downlink slot is a valid slot; when the downlink slot is a valid slot, determining a PDCCH detection opportunity corresponding to the downlink slot according to the K0 set.

Determining whether each downlink slot is a valid slot includes: determining whether the SLIV in the downlink slot is a valid SLIV; if all SLIVs in the downlink slot are invalid SLIVs, determining the downlink slot as an invalid slot, otherwise, determining the downlink slot as a valid downlink slot.

Further, determining the PDCCH detection opportunity set corresponding to each carrier according to the target offset set and the K0 set includes: when the number Krept of repetition transmissions of PDSCH is configured, determining the PDCCH detection opportunity set corresponding to each carrier according to the target offset set, the K0 set, and the number of repetition transmissions.

In a specific embodiment of the present disclosure, if the number Krept of repetition transmissions of PDSCH is configured, the PDCCH detection opportunity set corresponding to each carrier needs to be further determined according to the target offset set, the K0 set and the number of repetition transmissions.

Specifically, on the basis of determining the PDCCH detection opportunity according to $n\_U-w_i$, the first slot $n\_U-w_i-(Krept-1)$ in slots for repetition transmissions of PDSCH needs to further be determined for each $w_i$ according to the number of repetition transmission, and a slot $n\_U-w_i-(Krept-1)-k_{0,j}$ in which a PDCCH detection opportunity corresponding to $n\_U-w_i-(Krept-1)$ is located is determined based on the K0 set; the PDCCH detection opportunity in the slot $n\_U-w_i-(Krept-1)-k_{0,j}$ is also determined as the PDCCH detection opportunity corresponding to the carrier.

Further, after determining the HARQ-ACK codebook in the first slot according to the target offset set, the method further includes: receiving the HARQ-ACK codebook in the target uplink slot $n\_U\_gNB$, wherein, in a case that the TA_Offset includes a first transmission delay and a second transmission delay, $n\_U\_gNB=n\_U$; in a case that the TA_offset includes only a first transmission delay, n_U_gNB=n_U+TA_offset2, the first transmission delay is a transmission delay corresponding to a transmission path between the terminal and a cell reference point, the TA_offset2 is the second transmission delay, and the second transmission delay is a transmission delay corresponding to a transmission path from the cell reference point to the gateway station through the satellite.

In the method of determining a Hybrid Automatic Repeat reQuest acknowledgement codebook of the present disclosure, when the Hybrid Automatic Repeat reQuest acknowledgement (HARQ-ACK) is transmitted in the first slot, the HARQ-ACK codebook in the first slot is determined according to the target offset set W=K1+TA_offset. In this way, it may be ensured that the HARQ-ACK codebook correctly includes PDSCH candidate positions corresponding to HARQ-ACK feedback required to be performed in the first slot, thereby ensuring normal transmissions of HARQ-ACKs.

Implementation processes of the above method of determining a HARQ-ACK codebook will be described through specific embodiments below.

Embodiment 1: semi-static HARQ-ACK codebook. Assuming a carrier spacing of 120 kHz, TA_offset is 16, that is, 16 slots, and the K1 set is {1, 2, 3}, HARQ-ACK feedback is required to be performed in slot n+k+TA_offset according to PDSCH transmitted in a slot n. Assuming that k=3 corresponding to the PDSCH in the slot n=0, k=2 corresponding to a PDSCH in a slot n=1, and k=1 corresponding to a PDSCH in a slot n=2, then according to feedback timing, HARQ-ACK feedbacks for all of the three PDSCHs need to be performed in a slot n=19, and HARQ-ACK codebooks transmitted in the slot 19 need to be determined based on a set W=K1+TA_offset={17, 18, 19}. In a FDD mode, each slot has independent uplink and downlink resources, and each slot is a downlink DL slot. Therefore, according to n_U-$w_i$, the slot 0, the slot 1 and the slot 2 are DL slots, corresponding to the slot 19, determined on the basis of W (since for each slot, each symbol is DL, therefore, it is not necessary to judge whether the SLIV is valid and whether the slot is valid, and it is considered that the SLIV and the slot are valid), wherein n_U is the index of the slot in which HARQ-ACK transmission is located, that is, n_U is 19 in this case. Assuming that at most one PDSCH transmission exists in each DL slot, a size of the set $M_{A,c}$ corresponding the slot n_U is determined to be 3, i.e., 3 candidate PDSCH transmission positions are included, and the first position corresponds to the slot 0, the second position corresponds to the slot 1, and the third position corresponds to the slot 2. Assuming that each position only corresponds to 1-bit HARQ-ACK (of course, according to a transmission mode of multiple transmission blocks (TB), or according to a Code Block Group (CBG), a HARQ-ACK corresponding to more than 1 bit may be determined), thereby obtaining a HARQ-ACK codebook containing a 3 bit HARQ-ACK. The terminal transmits the determined HARQ-ACK codebook on a PUCCH resource corresponding to the slot n_U (which may be a PUCCH resource indicated by an indication field in the DCI scheduling the PDSCH), wherein if the terminal does not receive a PDSCH in a certain slot, then NACK is generated as feedback information. All terminals in a cell perform the above operation according to their respective TA_offset, so that it may be ensured that when transmissions, corresponding to the same n_U index, of different terminals reach the cell reference point, uplink time instants of the transmissions are aligned.

The base station works in a similar manner to that of the terminal. Difference therebetween is that if a relative TA is used for the terminal (for example, the TA_offset only compensates a TA corresponding to T3), then there is also a transmission delay difference of TA_offset2 between the base station (gateway station) and the cell reference point of the terminal. For this part, an actual index for n_U corresponding to a base station side needs to be determined through an offset of TA_offset2 on the basis of the timing corresponding to the cell reference point, that is, n_U_gNB=n_U+TA_offset2. For example, TA_offset is the number of slots corresponding to twice of T1+T2, so that the base station receives the HARQ-ACK according to the size of 3 bits in an uplink slot n_U+TA_offset2, and according to the above same mapping relationship as that for a terminal side, the HARQ-ACKs corresponding to the PDSCH in the slots 0, 1, and 2 are analyzed from the HARQ-ACK codebook, and further whether a corresponding PDSCH needs to be retransmitted is determined according to feedback information. If an absolute TA (that is, the TA_offset compensates the TA corresponding to T1, T2, T3) is used for the terminal, that is, the TA_offset is a value including TA_offset2, the base station can directly determine n_U in the same manner as that of the terminal, that is, n-U_gNB=n_U, without additionally performing slot position conversion based on TA_offset2.

Figure 7:
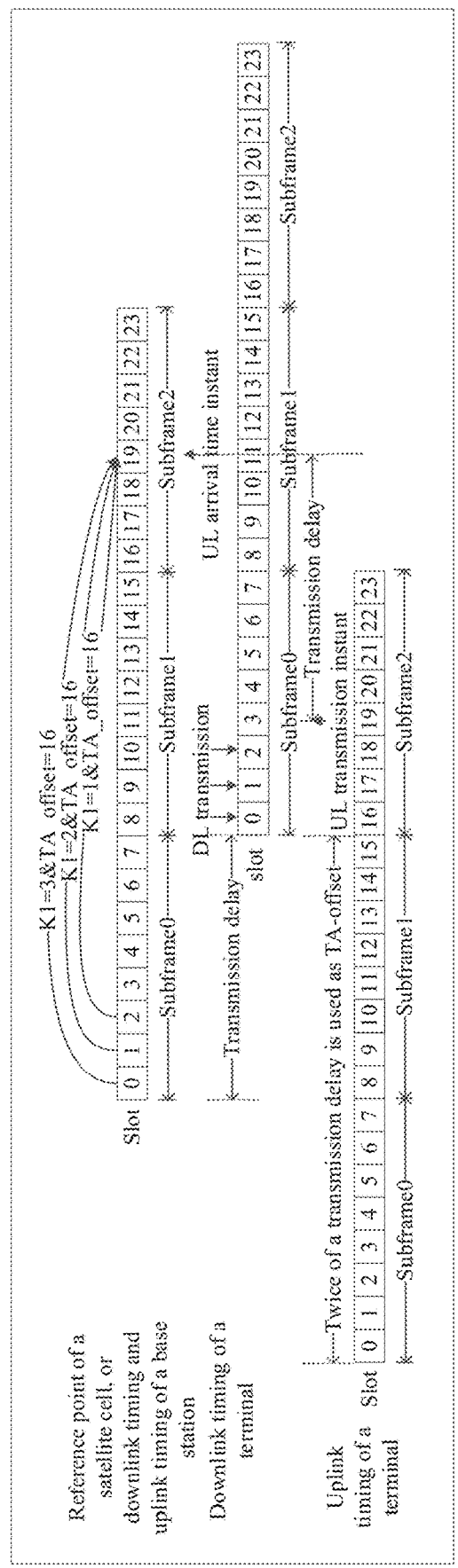
FIG. 7 is a first schematic diagram of uplink and downlink timing of a terminal and a network device according to some embodiments of the present disclosure.

In this manner, when timings, arriving the base station, of a plurality of terminals are aligned (that is, when the terminal determines, according to the feedback timing, that a time instant of the HARQ-ACK codebook, transmitted in the slot n_U, arriving at the base station is the slot n_U at the base station side, so as to ensure that that arrival time instants in one slot n_U, arriving at the base station, of uplink transmissions of different terminals are aligned when different terminals perform uplink transmissions according to respective TAs), and it may be ensured that the codebook can contain HARQ-ACK information corresponding to all candidate PDSCHs, HARQ-ACK feedback of which may be performed in the slot n_U. As shown in FIG. 7, when candidate PDSCHs are determined according to K1+TA_offset in the slot n_U, a set $M_{A,c}$ corresponding to the slot n_U may include the PDSCHs in the slots n=0, 1, 3, therefore, there may be consistent understanding about feedback correspondence between the terminal and the base station.

Figure 8:
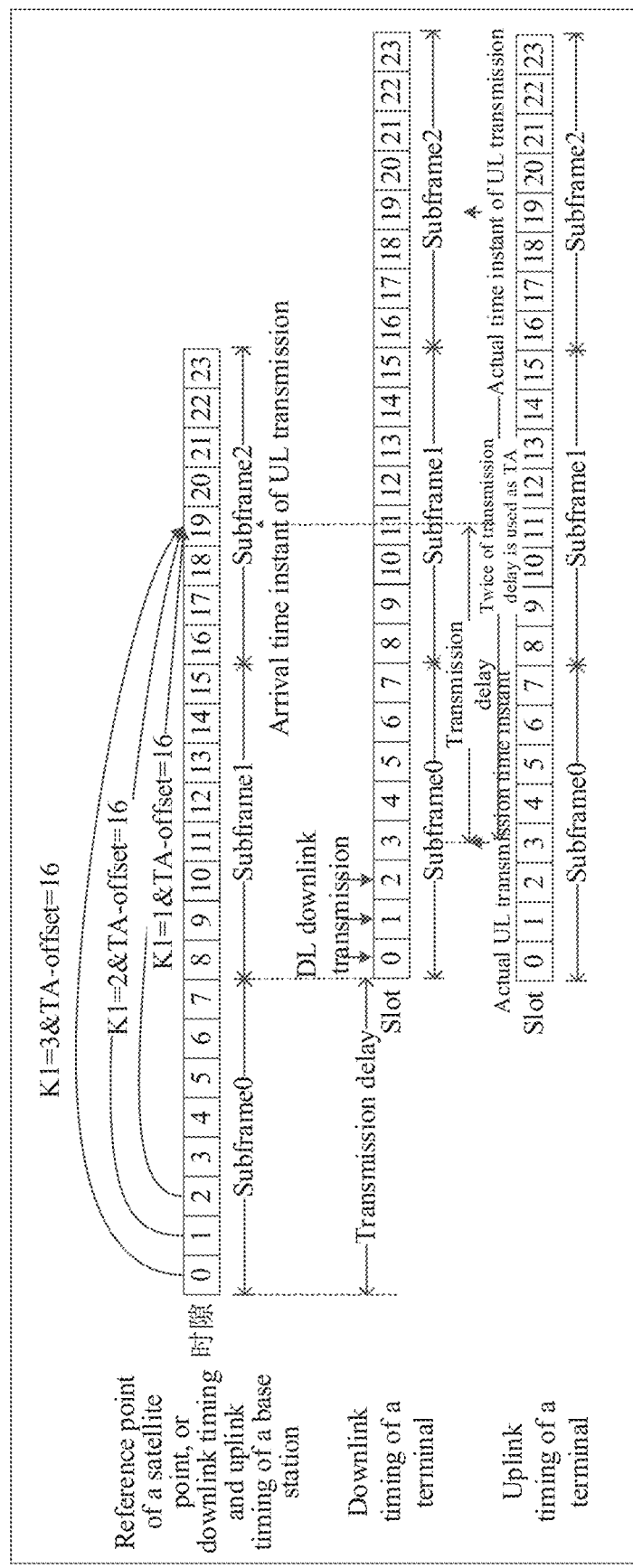
FIG. 8 is a second schematic diagram of uplink and downlink timing of a terminal and a network device according to some embodiments of the present disclosure.

In the above Embodiment 1, if n_U=n+k+TA_offset is determined according to the feedback timing relationship, and the actual transmission time instant is n_U'=n+k, that is, it is assumed that there is no TA offset between uplink timing and downlink timing on the terminal side, the actual transmission time instant needs to be achieved by advancing, by the TA, the time instant determined according to the feedback timing. This applies to the above manner, that is, in the slot n_U determined according to the feedback timing, the HARQ-ACK codebook is determined based on the K1+TA_offset set, so as to obtain the HARQ-ACK codebook for the case in which the feedback timing is in the slot n_U and the actual transmission time instant is in the slot n_U'. Therefore, in case that that timings, arriving at the base station, of a plurality of terminals are aligned (i.e., transmission of the HARQ-ACK codebook in the slot n_U is determined by the terminal in accordance with the feedback timing, the terminal advances the transmission by the TA and transmits the HARQ-ACK codebook in the slot n_u'; in this way, it may be ensured that the time instant of arriving at the base station is the slot n_U on the base station side, so as to ensure that the time instants, in one slot n_U, of arriving at the base station are aligned when different terminals perform uplink transmission according to their respective TAs). It is ensured that the codebook can contain HARQ-ACK information of all candidate PDSCHs, determined according to the feedback timing, which possibly need to feed back a HARQ-ACK in the slot n_U. As shown in FIG. 8, for the slot n_U determined according to the feedback timing (the actual time instant of the HARQ-ACK transmission may not be this time instant, but may be advanced by the TA with respect to this time instant), when the candidate PDSCH is determined according to K1+TA_offset, the PDSCHs in the slots n=0, 1 and 3 can be included in the set $M_{A,c}$, so that understanding of feedback correspondence relationship may be consistent with that of the base station, wherein the set $M_{A,c}$ represents the candidate PDSCH opportunity set corresponding to the carrier c.

Embodiment 2: dynamic HARQ-ACK codebook. The basic assumption in this embodiment is the same as that in Embodiment 1. In this case, it is additionally assumed that a PDSCH candidate time-domain position set corresponding to each DL slot includes one or more SLIVs, and each SLIV corresponds to a group of information used for determining a time-domain position of a PDSCH. The group of information includes a start symbol, a transmission length, a value of K0. Here, it is assumed that the value of K0 corresponding to each SLIV is fixed to 0 (of course, the value of K0 may also be plural, for example, K0={0, 1, 2}, etc., so that for one DL slot determined in the above-described Embodiment 1, it is necessary to determine, based on a plurality of values of $k_{0,j}$, slots in which a plurality of PDCCH detection opportunities are located, and then determine the corresponding PDCCH detection opportunities), DL slots corresponding to n_U may be determined as slots 0, 1, 2 in the same manner as that in Embodiment 1, and further the slots in which the PDCCH detection opportunities corresponding to the DL slots are located may also be determined as slots 0, 1 and 2 according to K0, so as to determine the PDCCH detection opportunities. The PDCCH is detected in corresponding PDCCH detection opportunities in the slots 0, 1, and 2, and the size of the HARQ-ACK codebook transmitted in the slot n_U and an arrangement order, in the codebook, of HARQ-ACKs corresponding to PDSCHs are determined according to the DAI in the PDCCH in the codebook, the determined HARQ-ACK codebook is transmitted on a correspond PUCCH resource in the slot n_U. The base station side is same as that on the terminal side, and the size and a mapping order of the HARQ-ACK codebook are determined, and reception is performed in a corresponding uplink slot n_U_gNB, and whether retransmission of the corresponding PDSCH needs to be performed is determined according to feedback information. n_U_gNB is a slot index of the reception at the base station side, and a determination manner thereof is the same as that in Embodiment 1.

In the method of determining a Hybrid Automatic Repeat reQuest acknowledgement codebook of the present disclosure, when the Hybrid Automatic Repeat reQuest acknowledgement (HARQ-ACK) is transmitted in the first slot, the HARQ-ACK codebook in the first slot is determined according to the target offset set W=K1+TA_offset. In this way, it may be ensured that the HARQ-ACK codebook correctly includes PDSCH candidate positions corresponding to HARQ-ACK feedback required to be performed in the first slot, thereby ensuring normal transmissions of HARQ-ACKs.

In the above embodiments of the present disclosure, a unit of K1 is a slot. Of course, the unit of K1 may also be other time durations, for example, the unit of K1 is a first time unit, and the time unit of TA_offset may be same as or different from K1. For example, the time unit of TA_offset is a second time unit, and the first time unit and the second time unit are the same or different. The first time unit or the second time unit may be A subframes, A slots, or A sub-slots, wherein the sub-slot is a predefined or configured time unit having a fixed length, such as N symbols (OFDM symbols).

Figure 9:
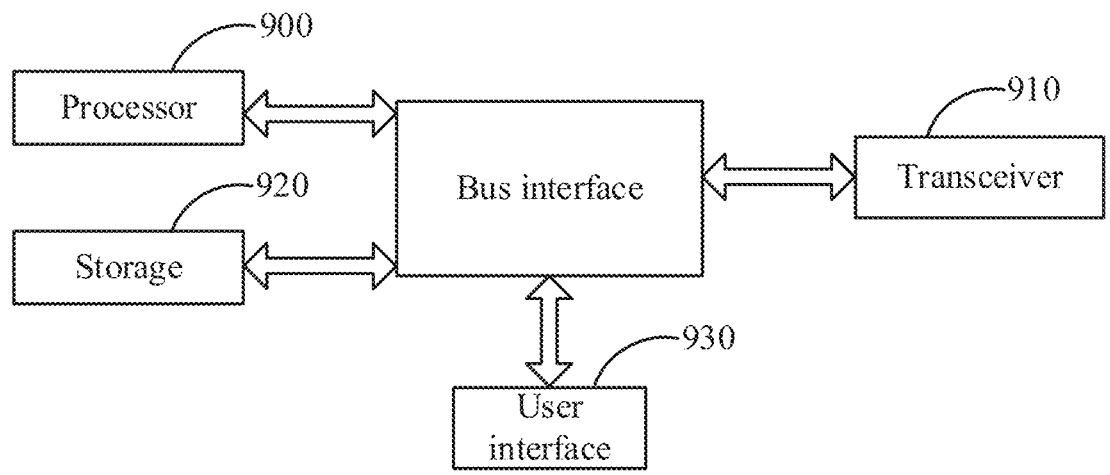
FIG. 9 is a structural block diagram of a terminal according to some embodiments of the present disclosure.

As shown in FIG. 9, some embodiments of the present disclosure also provide a terminal. The terminal includes a transceiver, a storage, a processor, and a computer program stored on the storage and executable on the processor. When the processor executes the computer program, the processor implements the following steps: determining a Hybrid Automatic Repeat reQuest (HARQ)-acknowledgement (ACK) codebook in a first slot according to a target offset set, when a HARQ-ACK is transmitted in the first slot.

The HARQ-ACK is a HARQ-ACK for a Physical Downlink Shared Channel (PDSCH) transmitted in a second slot or a HARQ-ACK for a Semi-Persistently Scheduled (SPS) PDSCH release transmitted in a second slot. The target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the K1 set, n_U is an index of the first slot, n is an index of the second slot.

In FIG. 9, a bus architecture may include any number of interconnected buses and bridges. Specifically, various circuits such as one or more processors represented by the processor 900 and a storage represented by the storage 920 are linked together. The bus architecture can also link various other circuits such as peripherals, voltage regulators, power management circuits, etc., which are all known in the art, and therefore, will not be further described herein. A bus interface provides an interface. The transceiver 910 may be a plurality of elements, including a transmitter and a receiver, and provide a unit for communicating with various other devices on the transmission medium. For different user equipment, a user interface 930 may also be an interface capable of connecting externally and internally with a required device. The connected equipment includes, but is not limited to, a keypad, a display, a speaker, a microphone, a joystick, and the like.

The processor 900 is responsible for managing the bus architecture and general processing, and the storage 920 can store data used by the processor 900 when performing operations.

Optionally, determining the HARQ-ACK codebook in the first slot according to the target offset set performed by the processor 900 includes: determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot; obtaining the HARQ-ACK codebook in the first slot according to the candidate PDSCH opportunity set corresponding to each carrier.

Optionally, determining the candidate PDSCH opportunity set corresponding to each carrier according to the target offset set performed by the processor 900 includes at least one of the following first and second manners.

A First Manner Includes Following:

obtaining each downlink slot corresponding to the first slot according to n_U-$w_i$; obtaining the candidate PDSCH opportunity set corresponding to each carrier according to the each downlink slot; where $w_i$ belongs to W, i=0, 1, . . . , T-1, T is the number of elements in W, or $w_i$=$k_i$+TA_offset. $k_i$ belongs to K1, i=0, 1, . . . , T-1, T is the number of elements in K1.

A Second Manner Includes Following:

obtaining each group of downlink slots corresponding to the first slot according to n_U-$w_i$-S, wherein each group of downlink slots includes at least one downlink slot; obtaining a candidate PDSCH opportunity set corresponding to each carrier according to each group of downlink slots; wherein S=0, 1, . . . , Krept-1, Krept is the number of repetition transmissions of PDSCH, and Krept=1 when repetition transmission is not configured; $w_i$ belongs to W, i=0, 1, . . . , T-1, T is the number of elements in W, or $w_i$=$k_i$+TA_offset, $k_i$ belongs to K1, i=0, 1, . . . , T-1, T is the number of elements in K1.

Optionally, obtaining the candidate PDSCH opportunity set corresponding to each carrier according to each downlink slot performed by the processor 900 includes: determining the each downlink slot as a candidate PDSCH opportunity; or, determining whether each downlink slot includes a valid SLIV as a PDSCH time-domain transmission position, and taking each downlink slot including the valid SLIV as a candidate PDSCH opportunity; or, determining each downlink slot as a candidate PDSCH opportunity if receiving more than one PDSCH in one slot is not supported, and determining, for the each downlink slot, at least one SLIV group according to an overlapping rule of SLIVs in a slot, and taking each SLIV group as a candidate PDSCH opportunity, if receiving more than one PDSCH in one slot is supported; or, determining whether the each downlink slot includes a valid SLIV as a PDSCH time-domain transmission position, and taking each downlink slot including the valid SLIV as one candidate PDSCH opportunity if receiving more than one PDSCH in one slot is not supported, or determining, for each downlink slot including a valid SLIV, at least one SLIV group according to an overlapping rule of valid SLIVs in one slot, and taking each SLIV group as a candidate PDSCH opportunity, if receiving more than one PDSCH in one slot is supported.

Obtaining the candidate PDSCH opportunity set corresponding to each carrier according to each group of downlink slots performed by the processor includes: determining, for each group of downlink slots, whether one SLIV in the SLIV set is valid in each downlink slot in the group of downlink slots, and when a valid SLIV is included in the SLIV set, determining the each group of downlink slots as one candidate PDSCH opportunity; or, determining, for each group of downlink slots, whether one SLIV in the SLIV set is valid in each downlink slot in the each group of downlink slots; and when a valid SLIV is included in the SLIV set, and determining each group of downlink slots as a candidate PDSCH opportunity if receiving more than one PDSCH in one slot is not supported, or determining at least one SLIV group according to the overlapping rule of valid SLIVs, and taking each SLIV group as a candidate PDSCH opportunity, if receiving more than one PDSCH in one slot is supported.

Optionally, in the above first manner, determining whether the SLIV is valid performed by the processor 900 includes: when a time-domain symbol corresponding to the SLIV overlaps with at least one uplink symbol in a corresponding downlink slot, determining that the SLIV is an invalid SLIV, otherwise, determining that the SLIV is a valid SLIV For the above second manner, determining whether the SLIV is valid performed by the processor 900 includes: determining that the SLIV is an invalid SLIV when a time-domain symbol corresponding to the SLIV overlaps with at least one uplink symbol in any downlink slot of a corresponding group of downlink slots; otherwise, determining the SLIV as a valid SLIV Optionally, determining the HARQ-ACK codebook in the first slot according to the target offset set performed by the processor 900 includes: when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH transmission and a slot of a PDSCH transmission scheduled by the PDCCH; detecting a PDCCH in an entirety set of the PDCCH detection opportunity set corresponding to each carrier, and determining an HARQ-ACK codebook in the first slot according to a Downlink Allocation Index (DAI) value in the detected PDCCH.

Optionally, determining the PDCCH detection opportunity set corresponding to each carrier according to the target offset set and the K0 set performed by the processor 900 includes: when the number Krept of repetition transmissions of PDSCH is configured, determining the PDCCH detection opportunity set corresponding to each carrier according to the target offset set, the K0 set, and the number of repetition transmissions.

Optionally, the index of an uplink slot is numbered in a manner of being a TA time ahead of the index of a downlink slot, wherein TA=TA_offset, or TA is greater than TA_offset; or the index of an uplink slot is numbered in a manner that the uplink slot is aligned with a downlink slot.

In the terminal according to the embodiments of the present disclosure, when the Hybrid Automatic Repeat reQuest acknowledgement (HARQ-ACK) is transmitted in the first slot, the HARQ-ACK codebook in the first slot is determined according to the target offset set W=K1+TA_offset. In this way, it may be ensured that the HARQ-ACK codebook correctly includes PDSCH candidate positions corresponding to HARQ-ACK feedback required to be performed in the first slot, thereby ensuring normal transmissions of HARQ-ACKs.

The terminal according to the embodiments of the present disclosure can implement all implementations in the above embodiments of the method of determining the HARQ-ACK codebook applied to the terminal side, and can achieve the same technical effects. Detailed description is not repeated here.

In some embodiments of the present disclosure, a computer readable storage medium is also provided. A computer program is stored on the computer readable storage medium. When the computer readable storage medium is executed by a processor, the processor implements a following step: determining a Hybrid Automatic Repeat reQuest (HARQ)-acknowledgement (ACK) codebook in a first slot according to a target offset set, when a HARQ-ACK is transmitted in the first slot; wherein the HARQ-ACK is a HARQ-ACK for a Physical Downlink Shared Channel (PDSCH) transmitted in a second slot or a HARQ-ACK for a Semi-Persistently Scheduled (SPS) PDSCH release transmitted in a second slot, the target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the K1 set, n_U is an index of the first slot, n is an index of the second slot.

When the program is executed by the processor, all implementations in the above embodiments of the method of determining the HARQ-ACK codebook applied to the terminal side can be implemented, and the same technical effect can be achieved. Detailed description is not repeated here.

Figure 10:
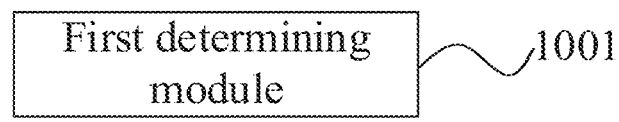
FIG. 10 is a block diagram of a terminal in an embodiment of the disclosure.

As shown in FIG. 10, some embodiments of the present disclosure also provide a terminal. The terminal includes a first determining module 1001, configured to determine a Hybrid Automatic Repeat reQuest (HARQ)-acknowledgement (ACK) codebook in a first slot according to a target offset set, when a HARQ-ACK is transmitted in the first slot; wherein the HARQ-ACK is a HARQ-ACK for a Physical Downlink Shared Channel (PDSCH) transmitted in a second slot or a HARQ-ACK for a Semi-Persistently Scheduled (SPS) PDSCH release transmitted in a second slot; the target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the K1 set, n_U is an index of the first slot, n is an index of the second slot.

In the terminal of the embodiment of the present disclosure, the first determining module includes a first determining submodule and a second determining submodule. The first determining submodule is configured to determine a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot. The second determining submodule is configured to obtain the HARQ-ACK codebook in the first slot according to the candidate PDSCH opportunity set corresponding to each carrier.

In the terminal of the embodiment of the present disclosure, the first determination submodule is configured to perform at least one of the following first and second manners.

A First Manner Includes Following:

obtaining each downlink slot corresponding to the first slot according to n_U-$w_i$; obtaining the candidate PDSCH opportunity set corresponding to each carrier according to the each downlink slot; where $w_i$ belongs to W, i=0, 1, . . . , T-1, T is the number of elements in W, or $w_i$=$k_i$+TA_offset. $k_i$ belongs to K1, i=0, 1, . . . , T-1, T is the number of elements in K1.

A Second Manner Includes Following:

obtaining each group of downlink slots corresponding to the first slot according to n_U-$w_i$-S, wherein each group of downlink slots includes at least one downlink slot; obtaining a candidate PDSCH opportunity set corresponding to each carrier according to each group of downlink slots; wherein S=0, 1, . . . , Krept-1, Krept is the number of repetition transmissions of PDSCH, and Krept=1 when repetition transmission is not configured; $w_i$ belongs to W, i=0, 1, . . . , T-1, T is the number of elements in W, or $w_i$=$k_i$+TA_offset, $k_i$ belongs to K1, i=0, 1, . . . , T-1, T is the number of elements in K1.

In the terminal in the embodiments of the present disclosure, for the above first manner, the first determining submodule is configured to determine the each downlink slot as a candidate PDSCH opportunity; or, determine whether each downlink slot includes a valid SLIV as a PDSCH time-domain transmission position, and take each downlink slot including the valid SLIV as a candidate PDSCH opportunity; or, determine each downlink slot as a candidate PDSCH opportunity if receiving more than one PDSCH in one slot is not supported, and determine, for the each downlink slot, at least one SLIV group according to an overlapping rule of SLIVs in a slot, and take each SLIV group as a candidate PDSCH opportunity, if receiving more than one PDSCH in one slot is supported; or, determine whether the each downlink slot includes a valid SLIV as a PDSCH time-domain transmission position, and take each downlink slot including the valid SLIV as one candidate PDSCH opportunity if receiving more than one PDSCH in one slot is not supported, or determine, for each downlink slot including a valid SLIV, at least one SLIV group according to an overlapping rule of valid SLIVs in one slot, and take each SLIV group as a candidate PDSCH opportunity, if receiving more than one PDSCH in one slot is supported.

For the above second manner, the first determining submodule is configured to determine, for each group of downlink slots, whether one SLIV in the SLIV set is valid in each downlink slot in the group of downlink slots, and when a valid SLIV is included in the SLIV set, determine the each group of downlink slots as one candidate PDSCH opportunity; or, determine, for each group of downlink slots, whether one SLIV in the SLIV set is valid in each downlink slot in the each group of downlink slots; and when a valid SLIV is included in the SLIV set, and determine each group of downlink slots as a candidate PDSCH opportunity if receiving more than one PDSCH in one slot is not supported, or determine at least one SLIV group according to the overlapping rule of valid SLIVs, and take each SLIV group as a candidate PDSCH opportunity, if receiving more than one PDSCH in one slot is supported.

In the terminal of the embodiments of the present disclosure, for the above first manner, the first determining submodule is configured to: when a time-domain symbol corresponding to the SLIV overlaps with at least one uplink symbol in a corresponding downlink slot, determine that the SLIV is an invalid SLIV, otherwise, determine that the SLIV is a valid SLIV For the above second manner, the first determining submodule is configured to: determine that the SLIV is an invalid SLIV when a time-domain symbol corresponding to the SLIV overlaps with at least one uplink symbol in any downlink slot of a corresponding group of downlink slots; otherwise, determine the SLIV as a valid SLIV.

In the terminal of the embodiments of the present disclosure, the first determining module includes a third determining submodule and a fourth determining submodule.

The third determining submodule is configured to, when the HARQ-ACK codebook is a dynamic HARQ-ACK codebook, determine a PDCCH detection opportunity set corresponding to each carrier according to the target offset set and a K0 set, wherein, K0 represents a set of timing values for an interval between a slot of a PDCCH transmission and a slot of a corresponding PDSCH transmission scheduled by the PDCCH. The fourth determining submodule is configured to detect a PDCCH in an entirety set of the PDCCH detection opportunity set corresponding to each carrier, and determine an HARQ-ACK codebook in the first slot according to a Downlink Allocation Index (DAI) value in the detected PDCCH.

In the terminal of the embodiments of the present disclosure, the third determining submodule is configured to, when the number Krept of repetition transmissions of PDSCH is configured, determine the PDCCH detection opportunity set corresponding to each carrier according to the target offset set, the K0 set, and the number of repetition transmissions.

In the terminal of the embodiments of the present disclosure, an index of an uplink slot is numbered in a manner of being a TA time ahead of an index of a downlink slot, wherein TA=TA_offset, or TA is greater than TA_offset; or an index of an uplink slot is numbered in a manner that the uplink slot is aligned with a downlink slot.

In the terminal of the embodiments of the present disclosure, when the Hybrid Automatic Repeat reQuest acknowledgement (HARQ-ACK) is transmitted in the first slot, the HARQ-ACK codebook in the first slot is determined according to the target offset set W=K1+TA_offset. In this way, it may be ensured that the HARQ-ACK codebook correctly includes PDSCH candidate positions corresponding to HARQ-ACK feedback required to be performed in the first slot, thereby ensuring normal transmissions of HARQ-ACKs.

The terminal according to the embodiments of the present disclosure can implement all implementations of the above method of determining the HARQ-ACK codebook applied to the terminal side, and can achieve the same technical effects. Detailed description is not repeated here.

Figure 11:
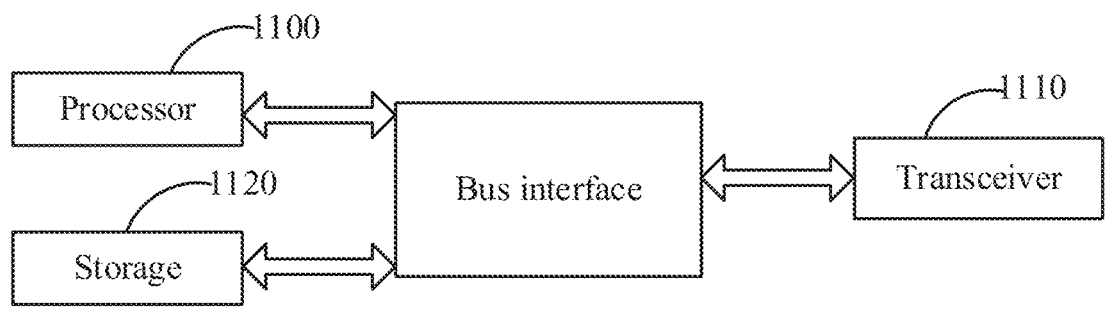
FIG. 11 is a structural block diagram of a network device according to some embodiments of the present disclosure.

As shown in FIG. 11, embodiments of the present disclosure also provide a network device, which may be specifically a base station. The network device includes a storage 1120, a processor 1100, a transceiver 1110, a bus interface, and a computer program stored on the storage 1120 and executable on the processor 1100. The processor 1100 is configured to read the program in the storage 1120, and perform the following step: determining a Hybrid Automatic Repeat reQuest (HARQ)-acknowledgement (ACK) codebook in a first slot according to a target offset set, when a HARQ-ACK is received in the first slot, wherein the HARQ-ACK is a HARQ-ACK for a Physical Downlink Shared Channel (PDSCH) transmitted in a second slot or a HARQ-ACK for a Semi-Persistently Scheduled (SPS) PDSCH release transmitted in a second slot. The target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the K1 set, n_U is an index of the first slot, n is an index of the second slot.

In FIG. 11, a bus architecture may include any number of interconnected buses and bridges. Specifically, various circuits such as one or more processors represented by the processor 1100 and a storage represented by the storage 1120 are linked together. The bus architecture can also link various other circuits such as peripherals, voltage regulators, power management circuits, etc., which are all known in the art, and therefore, will not be further described herein. A bus interface provides an interface. The transceiver 1110 may be a plurality of elements, including a transmitter and a receiver, and provide a unit for communicating with various other devices on the transmission medium. The processor 1100 is responsible for managing the bus architecture and general processing, and the storage 1120 can store data used by the processor 1100 when performing operations.

Optionally, determining the HARQ-ACK codebook in the first slot according to the target offset set performed by the processor 1100 includes: determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot; obtain the HARQ-ACK codebook in the first slot according to the candidate PDSCH opportunity set corresponding to each carrier.

Optionally, determining the candidate PDSCH opportunity set corresponding to each carrier according to the target offset set performed by the processor 1100 includes at least one of the following first and second manners.

A First Manner Includes Following:

obtaining each downlink slot corresponding to the first slot according to $n\_U-w_i$; obtaining the candidate PDSCH opportunity set corresponding to each carrier according to the each downlink slot; where $w_i$ belongs to W, i=0, 1, . . . , T-1, T is the number of elements in W, or $w_i=k_i+TA\_offset$. $k_i$ belongs to K1, i=0, 1, . . . , T-1, T is the number of elements in K1.

A Second Manner Includes Following:

obtaining each group of downlink slots corresponding to the first slot according to $n\_U-w_i-S$, wherein each group of downlink slots includes at least one downlink slot; obtaining a candidate PDSCH opportunity set corresponding to each carrier according to each group of downlink slots; wherein S=0, 1, . . . , Krept-1, Krept is the number of repetition transmissions of PDSCH, and Krept=1 when repetition transmission is not configured; $w_i$ belongs to W, i=0, 1, . . . , T-1, T is the number of elements in W, or $w_i=k_i+TA\_offset$, $k_i$ belongs to K1, i=0, 1, . . . , T-1, T is the number of elements in K1.

Optionally, obtaining the candidate PDSCH opportunity set corresponding to each carrier according to each downlink slot performed by the processor 1100 includes: determining the each downlink slot as a candidate PDSCH opportunity; or, determining whether each downlink slot includes a valid SLIV as a PDSCH time-domain transmission position, and taking each downlink slot including the valid SLIV as a candidate PDSCH opportunity; or, determining each downlink slot as a candidate PDSCH opportunity if receiving more than one PDSCH in one slot is not supported, and determining, for the each downlink slot, at least one SLIV group according to an overlapping rule of SLIVs in a slot, and taking each SLIV group as a candidate PDSCH opportunity, if receiving more than one PDSCH in one slot is supported; or, determining whether the each downlink slot includes a valid SLIV as a PDSCH time-domain transmission position, and taking each downlink slot including the valid SLIV as one candidate PDSCH opportunity if receiving more than one PDSCH in one slot is not supported, or determining, for each downlink slot including a valid SLIV, at least one SLIV group according to an overlapping rule of valid SLIVs in one slot, and taking each SLIV group as a candidate PDSCH opportunity, if receiving more than one PDSCH in one slot is supported.

Obtaining the candidate PDSCH opportunity set corresponding to each carrier according to each group of downlink slots performed by the processor includes: determining, for each group of downlink slots, whether one SLIV in the SLIV set is valid in each downlink slot in the group of downlink slots, and when a valid SLIV is included in the SLIV set, determining the each group of downlink slots as one candidate PDSCH opportunity; or, determining, for each group of downlink slots, whether one SLIV in the SLIV set is valid in each downlink slot in the each group of downlink slots; and when a valid SLIV is included in the SLIV set, and determining each group of downlink slots as a candidate PDSCH opportunity if receiving more than one PDSCH in one slot is not supported, or determining at least one SLIV group according to the overlapping rule of valid SLIVs, and taking each SLIV group as a candidate PDSCH opportunity, if receiving more than one PDSCH in one slot is supported.

Optionally, for the above first manner, determining whether the SLIV is valid performed by the processor 1100 includes: when a time-domain symbol corresponding to the SLIV overlaps with at least one uplink symbol in a corresponding downlink slot, determining that the SLIV is an invalid SLIV, otherwise, determining that the SLIV is a valid SLIV Further, for the above second manner, determining whether the SLIV is valid performed by the processor 1100 includes: determining that the SLIV is an invalid SLIV when a time-domain symbol corresponding to the SLIV overlaps with at least one uplink symbol in any downlink slot of a corresponding group of downlink slots; otherwise, determining the SLIV as a valid SLIV Optionally, determining the HARQ-ACK codebook in the first slot according to the target offset set performed by the processor 1100 includes: when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH transmission and a slot of a PDSCH transmission scheduled by the PDCCH; transmitting a PDCCH in at least one PDCCH detection opportunity in an entirety set of the PDCCH detection opportunity set corresponding to each carrier, and determining an HARQ-ACK codebook in the first slot according to a Downlink Allocation Index (DAI) value in the transmitted PDCCH.

Optionally, determining the PDCCH detection opportunity set corresponding to each carrier according to the target offset set and the K0 set performed by the processor 1100 includes: when the number Krept of repetition transmissions of PDSCH is configured, determining the PDCCH detection opportunity set corresponding to each carrier according to the target offset set, the K0 set, and the number of repetition transmissions.

Optionally, an index of an uplink slot is numbered in a manner of being a TA time ahead of an index of a downlink slot, wherein TA=TA_offset, or TA is greater than TA_offset; or an index of an uplink slot is numbered in a manner that an uplink slot is aligned with a downlink slot.

In the network device of the embodiments of the present disclosure, when the Hybrid Automatic Repeat reQuest acknowledgement (HARQ-ACK) is transmitted in the first slot, the HARQ-ACK codebook in the first slot is determined according to the target offset set W=K1+TA_offset. In this way, it may be ensured that the HARQ-ACK codebook correctly includes PDSCH candidate positions corresponding to HARQ-ACK feedback required to be performed in the first slot, thereby ensuring normal transmissions of HARQ-ACKs.

The network device according to the embodiments of the present disclosure can implement all implementations in the above method of determining the HARQ-ACK codebook applied to the network device side, and can achieve the same technical effects. Detailed description thereof is omitted here to avoid repetition.

Some embodiments of the present disclosure further provide a computer readable storage medium having stored thereon a computer program. When the computer program is executed by a processor, the processor implements a following step: determining a Hybrid Automatic Repeat reQuest (HARQ)-acknowledgement (ACK) codebook in a first slot according to a target offset set, when a HARQ-ACK is received in the first slot; wherein the HARQ-ACK is a HARQ-ACK for a Physical Downlink Shared Channel (PDSCH) transmitted in a second slot or a HARQ-ACK for a Semi-Persistently Scheduled (SPS) PDSCH release transmitted in a second slot. The target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the K1 set, n_U is an index of the first slot, n is an index of the second slot.

When the program is executed by the processor, all implementations in the above method of determining the HARQ-ACK codebook applied to the network device side can be implemented, and the same technical effect can be achieved. Detailed description thereof is omitted here to avoid repetition.

Figure 12:
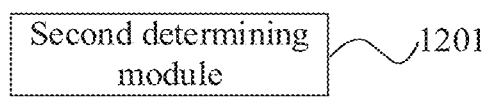
FIG. 12 is a schematic diagram of modules of a network device according to some embodiments of the present disclosure.

As shown in FIG. 12, some embodiments of the present disclosure further provide a network device. The network device includes a second determining module 1201.

The second determining module 1201, is configured to determine a Hybrid Automatic Repeat reQuest (HARQ)-acknowledgement (ACK) codebook in a first slot according to a target offset set, when a HARQ-ACK is received in the first slot; wherein the HARQ-ACK is a HARQ-ACK for a Physical Downlink Shared Channel (PDSCH) transmitted in a second slot or a HARQ-ACK for a Semi-Persistently Scheduled (SPS) PDSCH release transmitted in a second slot. The target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the K1 set, n_U is an index of the first slot, n is an index of the second slot.

In the embodiment of the present disclosure, the second determining module includes a fifth determining submodule and a sixth determining submodule.

The fifth determining submodule is configured to determine a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot. The sixth determining submodule is configured to obtain the HARQ-ACK codebook in the first slot according to the candidate PDSCH opportunity set corresponding to each carrier.

In the embodiment of the present disclosure, the fifth determining submodule is configured to perform at least one of the following first and second manners.

A First Manner Includes Following:
obtaining each downlink slot corresponding to the first slot according to n_U−w_i; obtaining the candidate PDSCH opportunity set corresponding to each carrier according to the each downlink slot; where $w_i$ belongs to W, i=0, 1, ..., T-1, T is the number of elements in W, or $w_i=k_i+TA\_offset$. $k_i$ belongs to K1, i=0, 1, ..., T-1, T is the number of elements in K1.

A Second Manner Includes Following:

obtaining each group of downlink slots corresponding to the first slot according to n_U-$w_i$-S, wherein each group of downlink slots includes at least one downlink slot; obtaining a candidate PDSCH opportunity set corresponding to each carrier according to each group of downlink slots; wherein S=0, 1, ..., Krept-1, Krept is the number of repetition transmissions of PDSCH, and Krept=1 when repetition transmission is not configured; $w_i$ belongs to W, i=0, 1, ..., T-1, T is the number of elements in W, or $w_i=k_i+TA\_offset$, $k_i$ belongs to K1, i=0, 1, ..., T-1, T is the number of elements in K1.

In the embodiment of the present disclosure, for the first manner, the fifth determining submodule is configured to: determine the each downlink slot as a candidate PDSCH opportunity; or, determine whether each downlink slot includes a valid SLIV as a PDSCH time-domain transmission position, and take each downlink slot including the valid SLIV as a candidate PDSCH opportunity; or, determine each downlink slot as a candidate PDSCH opportunity if receiving more than one PDSCH in one slot is not supported, and determine, for the each downlink slot, at least one SLIV group according to an overlapping rule of SLIVs in a slot, and take each SLIV group as a candidate PDSCH opportunity, if receiving more than one PDSCH in one slot is supported; or, determine whether the each downlink slot includes a valid SLIV as a PDSCH time-domain transmission position, and take each downlink slot including the valid SLIV as one candidate PDSCH opportunity if receiving more than one PDSCH in one slot is not supported, or determine, for each downlink slot including a valid SLIV, at least one SLIV group according to an overlapping rule of valid SLIVs in one slot, and take each SLIV group as a candidate PDSCH opportunity, if receiving more than one PDSCH in one slot is supported.

For the second manner, the fifth determining submodule is configured to: determine, for each group of downlink slots, whether one SLIV in the SLIV set is valid in each downlink slot in the group of downlink slots, and when a valid SLIV is included in the SLIV set, determine the each group of downlink slots as one candidate PDSCH opportunity; or, determine, for each group of downlink slots, whether one SLIV in the SLIV set is valid in each downlink slot in the each group of downlink slots; and when a valid SLIV is included in the SLIV set, and determine each group of downlink slots as a candidate PDSCH opportunity if receiving more than one PDSCH in one slot is not supported, or determine at least one SLIV group according to the overlapping rule of valid SLIVs, and take each SLIV group as a candidate PDSCH opportunity, if receiving more than one PDSCH in one slot is supported.

In the embodiment of the present disclosure, for the above first manner, the fifth determining submodule is configured to: when a time-domain symbol corresponding to the SLIV overlaps with at least one uplink symbol in a corresponding downlink slot, determine that the SLIV is an invalid SLIV, otherwise, determine that the SLIV is a valid SLIV For the above second manner, the fifth determining submodule is configured to: determine that the SLIV is an invalid SLIV when a time-domain symbol corresponding to the SLIV overlaps with at least one uplink symbol in any downlink slot of a corresponding group of downlink slots; otherwise, determine the SLIV as a valid SLIV.

In the embodiment of the present disclosure, the second determining module includes a seventh determining submodule and an eighth determining submodule.

The seventh determining submodule is configured to: when the HARQ-ACK codebook is a dynamic HARQ-ACK codebook, determine a PDCCH detection opportunity set corresponding to each carrier according to the target offset set and a K0 set, wherein, K0 represents a set of timing values for an interval between a slot of a PDCCH transmission and a slot of a PDSCH transmission scheduled by the PDCCH. The eighth determining submodule is configured to transmit a PDCCH in at least one PDCCH detection opportunity in an entirety set of the PDCCH detection opportunity set corresponding to each carrier, and determine an HARQ-ACK codebook in the first slot according to a Downlink Allocation Index (DAI) value in the transmitted PDCCH.

In the embodiment of the present disclosure, the seventh determining submodule is configured to, when the number Krept of repetition transmissions of PDSCH is configured, determine the PDCCH detection opportunity set corresponding to each carrier according to the target offset set, the K0 set, and the number of repetition transmissions.

In the embodiment of the present disclosure, an index of an uplink slot is numbered in a manner of being a TA time ahead of an index of a downlink slot, wherein TA=TA_offset, or TA is greater than TA_offset; or an index of an uplink slot is numbered in a manner that an uplink slot is aligned with a downlink slot.

In the network device of the embodiments of the present disclosure, when the Hybrid Automatic Repeat reQuest acknowledgement (HARQ-ACK) is transmitted in the first slot, the HARQ-ACK codebook in the first slot is determined according to the target offset set W=K1+TA_offset. In this way, it may be ensured that the HARQ-ACK codebook correctly includes PDSCH candidate positions corresponding to HARQ-ACK feedback required to be performed in the first slot, thereby ensuring normal transmissions of HARQ-ACKs.

The network device according to the embodiment of the present disclosure can implement all implementations in the above method of determining the HARQ-ACK codebook applied to the network device side, and can achieve the same technical effects. Detailed description thereof is omitted here to avoid repetition.

It will be appreciated that the embodiments described in the present disclosure may be implemented in hardware, software, firmware, middleware, microcode, or combinations thereof. For implementation in hardware, units, modules, sub-units and sub-modules may be implemented in one or more of Application Specific Integrated Circuits (ASIC), Digital Signal Processing (DSP), a DSP Device (DSPD), a Programmable Logic Device (PLD), a Field-Programmable Gate Array (FPGA), a general purpose processor, a controller, a microcontroller, a microprocessors, other electronic units for performing functions described in the present disclosure, or combinations thereof.

For implementation in software, techniques described in embodiments of the present disclosure may be implemented by modules (e.g., procedures, functions, etc.) that perform the functions described in embodiments of the present disclosure. Software codes may be stored in a storage and executed by a processor. The storage may be implemented in the processor or external to the processor.

In various embodiments of the present disclosure, it should be understood that values of sequence numbers of the above-described processes do not imply an order of execution, the order of execution of the processes should be determined by their functions and inherent logic, and should not be construed as any limitation on the implementation processes of the embodiments of the present disclosure.

The foregoing describes optional embodiments of the present disclosure, and it should be noted that several modifications and embellishments may be made by those of ordinary skill in the art without departing from the principles set forth in the present disclosure. These modifications and embellishments should also be considered to be within the protection scope of the present disclosure.

What is claimed is:

1. A method of determining a Hybrid Automatic Repeat reQuest acknowledgement codebook, performed by a terminal, the method comprising:
   determining a Hybrid Automatic Repeat reQuest (HARQ)-acknowledgement (ACK) codebook in a first slot according to a target offset set, when a HARQ-ACK is transmitted in the first slot;
   wherein the HARQ-ACK is a HARQ-ACK for a Physical Downlink Shared Channel (PDSCH) transmitted in a second slot or a Semi-Persistently Scheduled (SPS) PDSCH release transmitted in a second slot, the target offset set W=K1+TA offset, K1 is a set of timing values indicating an interval between a slot of the PDSCH or the SPS PDSCH release and a slot of a corresponding HARQ-ACK, TA_offset is a value related to a Timing Advance TA configured by a signaling or calculated in a predetermined manner, and n U=n+k+TA_offset, k is one of values in the set of K1, n_U is an index of the first slot, n is an index of the second slot.

2. The method according to claim 1, wherein,
   determining the HARQ-ACK codebook in the first slot according to the target offset set comprises:
      determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back HARQ-ACK in one slot;
      obtaining the HARQ-ACK codebook in the first slot according to the candidate PDSCH opportunity set corresponding to each carrier; and/or,
   determining the HARQ-ACK codebook in the first slot according to the target offset set comprises:
      when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH transmission and a slot of a PDSCH transmission scheduled by the PDCCH;
      detecting a PDCCH in an entirety set of the PDCCH detection opportunity set corresponding to each carrier, and determining an HARQ-ACK codebook in the first slot according to a Downlink Allocation Index (DAI) value in the detected PDCCH.

3. The method according to claim 2, wherein, when the HARQ-ACK codebook is the semi-static HARQ-ACK codebook, determining the candidate PDSCH opportunity set corresponding to each carrier according to the target offset set comprises at least one of the following first and second manners:
   the first manner comprises:
      obtaining each downlink slot corresponding to the first slot according to $n\_U-w_i$;
      obtaining the candidate PDSCH opportunity set corresponding to each carrier according to the each downlink slot;
         wherein $w_i$ belongs to W, i=0, 1, . . . , T−1, T is a quantity of elements in W, or $w_i-k_i+TA\_offset$, $k_i$ belongs to K1, i=0, 1, . . . , T−1, T is a quantity of elements in K1;
   the second manner comprises:
      obtaining each group of downlink slots corresponding to the first slot according to $n\_U-w_i-S$, wherein each group of downlink slots comprises at least one downlink slot;
      obtaining the candidate PDSCH opportunity set corresponding to each carrier according to the each group of downlink slots; wherein S=0, 1, . . . , Krept-1, Krept is a quantity of repetition transmissions of PDSCH, and Krept=1 when repetition transmission is not configured;
      $w_i$ belongs to W, i=0, 1, . . . , T−1, T is a quantity of elements in W, or
      $w_i-k_i+TA\_offset$, $k_i$ belongs to K1, i=0, 1, . . . , T−1, T is a quantity of elements in K1.

4. The method according to claim 3, wherein,
   in the first manner, obtaining the candidate PDSCH opportunity set corresponding to each carrier according to each downlink slot comprises:
      determining the each downlink slot as a candidate PDSCH opportunity; or,
      determining whether each downlink slot comprises a valid Start and Length Indicator Value (SLIV) as a PDSCH time-domain transmission position, and taking each downlink slot comprising a valid SLIV as the candidate PDSCH opportunity; or,
      determining the each downlink slot as a candidate PDSCH opportunity if receiving more than one PDSCH in one slot is not supported, or determining, for the each downlink slot, at least one SLIV group according to an overlapping rule of SLIVs in a slot, and taking each SLIV group as a candidate PDSCH opportunity, if receiving more than one PDSCH in one slot is supported; or,
      determining whether the each downlink slot comprises a valid SLIV as PDSCH time-domain transmission position, and taking each downlink slot comprising a valid SLIV as one candidate PDSCH opportunity if receiving more than one PDSCH in one slot is not supported, or determining, for each downlink slot comprising a valid SLIV, at least one SLIV group according to an overlapping rule of valid SLIVs in one slot, and taking each SLIV group as a candidate PDSCH opportunity, if receiving more than one PDSCH in one slot is supported;
   in the second manner, obtaining the candidate PDSCH opportunity set corresponding to each carrier according to each group of downlink slots comprises:
      determining, for each group of downlink slots, whether one SLIV in the SLIV set is valid in each downlink slot in the each group of downlink slots, and when a valid SLIV is comprised in the SLIV set, determining the each group of downlink slots as one candidate PDSCH opportunity; or,
      determining, for each group of downlink slots, whether one SLIV in the SLIV set is valid in each downlink slot in the each group of downlink slots; and when a valid SLIV is comprised in the SLIV set, determining the each group of downlink slots as a candidate PDSCH opportunity if receiving more than one PDSCH in one slot is not supported, or determining at least one SLIV group according to a SLIV overlapping rule of valid SLIVs and taking each SLIV group as a candidate PDSCH opportunity if receiving more than one PDSCH in one slot is supported.

5. The method according claim 4, wherein,
in the first manner, determining whether the SLIV is valid comprises:
determining that the SLIV is an invalid SLIV if a time-domain symbol corresponding to the SLIV overlaps with at least one uplink symbol in a corresponding downlink slot; otherwise, determining that the SLIV is a valid SLIV;
in the second manner, determining whether the SLIV is valid comprises:
determining that the SLIV is an invalid SLIV if a time-domain symbol corresponding to the SLIV overlaps with at least one uplink symbol in any downlink slot of a corresponding group of downlink slots; otherwise, determining the SLIV as a valid SLIV.

6. The method according claim 2, wherein when the HARQ-ACK codebook is the dynamic HARQ-ACK codebook, determining the PDCCH detection opportunity set corresponding to each carrier according to the target offset set and the K0 set comprises:
when a quantity Krept of repetition transmissions of PDSCH is configured, determining the PDCCH detection opportunity set corresponding to each carrier according to the target offset set, the K0 set, and the quantity of repetition transmissions.

7. The method according to claim 1, wherein an index of an uplink slot is numbered in a manner of being a TA time ahead of an index of a downlink slot, wherein TA=TA_offset, or TA is greater than TA_offset;
or, an index of an uplink slot is numbered in a manner that an uplink slot is aligned with a downlink slot.

8. A non-transitory computer-readable storage medium, comprising a computer program stored on the computer-readable storage medium, wherein, when the computer program is executed by the processor, the processor implements steps of the method of determining the Hybrid Automatic Repeat reQuest acknowledgement codebook according to claim 1.

9. A method of determining a Hybrid Automatic Repeat reQuest acknowledgement codebook, performed by a network device, the method comprising:
determining a Hybrid Automatic Repeat reQuest (HARQ)-acknowledgement (ACK) codebook in a first slot according to a target offset set, when a HARQ-ACK is received in the first slot;
wherein the HARQ-ACK is a HARQ-ACK, transmitted in a second slot, for a Physical Downlink Shared Channel (PDSCH) or a Semi-Persistently Scheduled (SPS) PDSCH release, the target offset set W=K1+TA_offset, K1 is a set of timing values indicating an interval between a slot of the PDSCH or the SPS PDSCH release and a slot of the corresponding HARQ-ACK, TA_offset is a value related to a Timing Advance TA configured by a signaling or calculated in a predetermined manner, and n_U=n+k+TA_offset, k is one of values in the set of K1, n U is an index of the first slot, n is an index of the second slot.

10. The method according to claim 9, wherein,
determining the HARQ-ACK codebook in the first slot according to the target offset set comprises:
determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot;
obtaining the HARQ-ACK codebook in the first slot according to the candidate PDSCH opportunity set corresponding to each carrier; and/or,
determining the HARQ-ACK codebook in the first slot according to the target offset set comprises:
when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH and a slot of a PDSCH scheduled by the PDCCH;
transmitting a PDCCH in at least one PDCCH detection opportunity in an entirety set of the PDCCH detection opportunity set corresponding to each carrier, and determining an HARQ-ACK codebook in the first slot according to a Downlink Allocation Index (DAI) value in the transmitted PDCCH.

11. The method according to claim 10, wherein when the HARQ-ACK codebook is the semi-static HARQ-ACK codebook, determining the candidate PDSCH opportunity set corresponding to each carrier according to the target offset set comprises at least one of the following first and second manners:
the first manner comprises:
obtaining each downlink slot corresponding to the first slot according to $n\_U-w_i$,
obtaining the candidate PDSCH opportunity set corresponding to each carrier according to the each downlink slot;
wherein $w_i$ belongs to W, i=0, 1, . . . , T−1, T is a quantity of elements in W, or $w_i=k+TA\_offset$, $k_i$ belongs to K1, i=0, 1, T−1, T is a quantity of elements in K1;
the second manner comprises:
obtaining each group of downlink slots corresponding to the first slot according to $n\_U-w_i-S$, wherein each group of downlink slots comprises at least one downlink slot;
obtaining the candidate PDSCH opportunity set corresponding to each carrier according to the each group of downlink slots; wherein S=0, 1, . . . , Krept-1, Krept is a quantity of repetition transmissions of PDSCH, and Krept=1 when no repetition transmission is configured;
$w_i$ belongs to W, i=0, 1, . . . , T−1, T is a quantity of elements in W, or
$w_i=k_i+TA\_offset$, $k_i$ belongs to K1, i=0, 1, . . . , T−1, T is a quantity of elements in K1.

12. The method according claim 11, wherein,
in the first manner, obtaining the candidate PDSCH opportunity set corresponding to each carrier according to each downlink slot comprises:
determining the each downlink slot as a candidate PDSCH opportunity; or,
determining whether each downlink slot comprises a valid Start and Length Indicator Value (SLIV) as a PDSCH time-domain transmission position, and taking each downlink slot comprising a valid SLIV as the candidate PDSCH opportunity; or, determining the each downlink slot as a candidate PDSCH opportunity if receiving more than one PDSCH in one slot is not supported, or determining, for the each downlink slot, at least one SLIV group according to an overlapping rule of SLIVs in a slot and taking each SLIV group as a candidate PDSCH opportunity if receiving more than one PDSCH in one slot is supported; or, determining whether the each downlink slot comprises a valid SLIV as a PDSCH time-domain transmission position, and taking each downlink slot comprising a valid SLIV as one candidate PDSCH opportunity if receiving more than one PDSCH in one slot is not supported, or determining, for each downlink slot comprising a valid SLIV, at least one SLIV group according to an overlapping rule of valid SLIVs in one slot and taking each SLIV group as a candidate PDSCH opportunity, if receiving more than one PDSCH in one slot is supported;

in the second manner, obtaining the candidate PDSCH opportunity set corresponding to each carrier according to each group of downlink slots comprises:

determining, for each group of downlink slots, whether one SLIV in the SLIV set is valid in each downlink slot in the each group of downlink slots, and when a valid SLIV is comprised in the SLIV set, determining the each group of downlink slots as one candidate PDSCH opportunity; or, determining, for each group of downlink slots, whether one SLIV in the SLIV set is valid in each downlink slot in the each group of downlink slots; and when a valid SLIV is comprised in the SLIV set, and determining the each group of downlink slots as a candidate PDSCH opportunity if receiving more than one PDSCH in one slot is not supported, or determining at least one SLIV group according to an overlapping rule of valid SLIVs, and taking each SLIV group as a candidate PDSCH opportunity, if receiving more than one PDSCH in one slot is supported.

13. The method according claim 12, wherein,
in the first manner, determining whether the SLIV is valid comprises:
determining that the SLIV is an invalid SLIV if a time-domain symbol corresponding to the SLIV overlaps with at least one uplink symbol in a corresponding downlink slot; otherwise, determining that the SLIV is a valid SLIV;
in the second manner, determining whether the SLIV is valid comprises:
determining that the SLIV is an invalid SLIV if a time-domain symbol corresponding to the SLIV overlaps with at least one uplink symbol in any downlink slot of a corresponding group of downlink slots; otherwise, determining the SLIV as a valid SLIV.

14. The method according to claim 10, wherein, when the HARQ-ACK codebook is the dynamic HARQ-ACK codebook, determining the PDCCH detection opportunity set corresponding to each carrier according to the target offset set and the K0 set comprises:
when a quantity Krept of repetition transmissions of PDSCH is configured, determining the PDCCH detection opportunity set corresponding to each carrier according to the target offset set, the K0 set, and the quantity of repetition transmissions.

15. The method according to claim 9, wherein an index of an uplink slot is numbered in a manner of being a TA time ahead of an index of a downlink slot, wherein TA-TA_offset, or TA is greater than TA_offset;
or, an index of an uplink slot is numbered in a manner that an uplink slot is aligned with a downlink slot.

16. A network device, comprising a transceiver, a storage, a processor, and a program stored on the storage and executable on the processor, wherein when the processor executes the program, the processor implements steps of the method of determining a Hybrid Automatic Repeat reQuest acknowledgement codebook according to claim 9.

17. The network device according to claim 16, wherein,
determining the HARQ-ACK codebook in the first slot according to the target offset set performed by the processor comprises:
determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot;
obtaining the HARQ-ACK codebook in the first slot according to the candidate PDSCH opportunity set corresponding to each carrier; and/or,
determining the HARQ-ACK codebook in the first slot according to the target offset set performed by the processor comprises:
when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH and a slot of a PDSCH scheduled by the PDCCH;
detecting a PDCCH in an entirety set of the PDCCH detection opportunity set corresponding to each carrier, and determining an HARQ-ACK codebook in the first slot according to a Downlink Allocation Index (DAI) value in the detected PDCCH.

18. A non-transitory computer-readable storage medium, comprising:
a computer program stored on the computer-readable storage medium, wherein, when the computer program is executed by a processor, the processor implements the method of determining the Hybrid Automatic Repeat reQuest acknowledgement codebook according to claim 9.

19. A terminal, comprising a transceiver, a storage, a processor and a program stored on the storage and executable on the processor, wherein when the processor executes the program, the processor implements following:
determining a Hybrid Automatic Repeat reQuest (HARQ)-acknowledgement (ACK) codebook in a first slot according to a target offset set, when a HARQ-ACK is transmitted in the first slot;
wherein the HARQ-ACK is a HARQ-ACK, transmitted in a second slot, for a Physical Downlink Shared Channel (PDSCH) or a Semi-Persistently Scheduled (SPS) PDSCH release, the target offset set W=K1+TA offset, K1 is a set of timing values indicating an interval between a slot of the PDSCH or the SPS PDSCH release and a slot of the corresponding HARQ-ACK, TA offset is a value related to a Timing Advance TA configured by a signaling or calculated in a predetermined manner, and n_U=n+k+TA_offset, k is one of values in the set of K1, n U is an index of the first slot, n is an index of the second slot.

20. The terminal according to claim 19, wherein,
determining the HARQ-ACK codebook in the first slot according to the target offset set performed by the processor comprises:
   determining a candidate PDSCH opportunity set corresponding to each carrier according to the target offset set when the HARQ-ACK codebook is a semi-static HARQ-ACK codebook, wherein the candidate PDSCH opportunity set is a set of candidate PDSCH opportunities that need to feed back a HARQ-ACK in one slot;
   obtaining the HARQ-ACK codebook in the first slot according to the candidate PDSCH opportunity set corresponding to each carrier; and/or, determining the HARQ-ACK codebook in the first slot according to the target offset set performed by the processor comprises:
   when the HARQ-ACK codebook is a dynamic HARQ-ACK codebook, determining a PDCCH detection opportunity set corresponding to each carrier according to the target offset set and a K0 set, wherein, K0 represents a set of timing values for an interval between a slot of a PDCCH and a slot of a PDSCH scheduled by the PDCCH;
   detecting a PDCCH in an entirety set of the PDCCH detection opportunity set corresponding to each carrier, and determining an HARQ-ACK codebook in the first slot according to a Downlink Allocation Index (DAI) value in the detected PDCCH.

* * * * *